(12) United States Patent
Denome et al.

(10) Patent No.: US 8,697,624 B2
(45) Date of Patent: *Apr. 15, 2014

(54) WATER-SOLUBLE FILM HAVING BLEND OF PVOH POLYMERS, AND PACKETS MADE THEREFROM

(75) Inventors: Frank William Denome, Cincinnati, OH (US); Steven G. Friedrich, Crown Point, IN (US); Regine Labeque, Neder-Over-Heembeek (BE); David M Lee, Crown Point, IN (US); Jichun Shi, Loveland, OH (US); Andrew P. Verrall, Crown Point, IN (US); Roxane Rosmaninho, Auderghem (BE)

(73) Assignee: The Procter & Gamble Company, Cincinnati, OH (US)

( * ) Notice: Subject to any disclaimer, the term of this patent is extended or adjusted under 35 U.S.C. 154(b) by 87 days.

This patent is subject to a terminal disclaimer.

(21) Appl. No.: 13/017,437

(22) Filed: Jan. 31, 2011

(65) Prior Publication Data

US 2011/0188784 A1 Aug. 4, 2011

Related U.S. Application Data

(60) Provisional application No. 61/299,836, filed on Jan. 29, 2010, provisional application No. 61/299,834, filed on Jan. 29, 2010.

(51) Int. Cl.
*C11D 17/04* (2006.01)
*C11D 3/37* (2006.01)
*B65D 85/84* (2006.01)

(52) U.S. Cl.
USPC ........... 510/296; 510/220; 510/221; 510/235; 510/120; 510/108; 510/406; 510/439; 206/524.7; 428/35.2

(58) Field of Classification Search
USPC ......... 510/296, 220, 221, 235, 120, 108, 406, 510/439; 206/524.7; 428/35.2
See application file for complete search history.

(56) References Cited

U.S. PATENT DOCUMENTS

| | | | |
|---|---|---|---|
| 2,220,099 A | 11/1940 | Guenther et al. | |
| 2,477,383 A | 7/1949 | Lewis | |
| 3,664,961 A | 5/1972 | Norris | |
| 3,929,678 A | 12/1975 | Laughlin et al. | |
| 3,975,280 A | 8/1976 | Hachmann et al. | |
| 4,000,093 A | 12/1976 | Nicol et al. | |
| 4,075,116 A | 2/1978 | Mesaros | |
| 4,119,604 A | 10/1978 | Wysong | |
| 4,155,971 A * | 5/1979 | Wysong | 264/204 |
| 4,156,047 A * | 5/1979 | Wysong | 428/220 |
| 4,222,905 A | 9/1980 | Cockrell, Jr. | |
| 4,239,659 A | 12/1980 | Murphy | |
| 4,259,217 A | 3/1981 | Murphy | |
| 4,713,248 A | 12/1987 | Kjornaes et al. | |
| 4,810,410 A | 3/1989 | Diakun et al. | |
| 4,828,744 A | 5/1989 | Kaufmann et al. | |
| 5,114,611 A | 5/1992 | Van Kralingen et al. | |
| 5,137,646 A | 8/1992 | Schmidt et al. | |
| 5,227,084 A | 7/1993 | Martens et al. | |
| 5,316,688 A | 5/1994 | Gladfelter et al. | |
| 5,340,496 A | 8/1994 | Sato et al. | |
| 5,576,281 A | 11/1996 | Bunch et al. | |
| 6,599,871 B2 | 7/2003 | Smith | |
| 6,632,869 B2 | 10/2003 | Weitzel | |
| 6,787,512 B1 | 9/2004 | Verrall et al. | |
| 6,995,125 B2 * | 2/2006 | Dasque et al. | 510/296 |
| 7,229,955 B2 * | 6/2007 | Dasque et al. | 510/296 |
| 7,304,023 B2 * | 12/2007 | Dasque et al. | 510/296 |
| 7,727,946 B2 | 6/2010 | Catalfamo et al. | |
| 2002/0161088 A1 | 10/2002 | Kochvar et al. | |
| 2003/0060390 A1 | 3/2003 | Demeyere et al. | |
| 2003/0108705 A1 | 6/2003 | Duffield et al. | |
| 2003/0139312 A1 | 7/2003 | Caswell et al. | |
| 2004/0204337 A1 | 10/2004 | Corona, III et al. | |
| 2005/0001348 A1 | 1/2005 | Kohnen et al. | |
| 2005/0061704 A1 | 3/2005 | Cole et al. | |
| 2005/0183394 A1 | 8/2005 | Hammond et al. | |
| 2005/0244444 A1 | 11/2005 | Kochvar et al. | |
| 2006/0172910 A1 * | 8/2006 | Brooker et al. | 510/293 |

(Continued)

FOREIGN PATENT DOCUMENTS

EP 0197434 A2 10/1986
EP 0197434 B1 7/1989

(Continued)

OTHER PUBLICATIONS

XP002632850, Clariant GmbH; Mowiol Polyvinyl manual; Dec. 31, 1999, p. 105PP; retrieved for Internet; URL; http://www2.cbm.uam.es/confocal/manuales/mowiol.pdf (Retrieved on Apr. 13, 2011) pp. B10, C4 p. EI-p. E4 p. G11.

(Continued)

*Primary Examiner* — Lorna M Douyon

(74) *Attorney, Agent, or Firm* — Melissa G. Krasocev; Steven W. Miller

(57) ABSTRACT

Disclosed are plasticized, water-soluble films having favorable cold-water solubility, wet handling, and thermoforming characteristics, and which can include a PVOH resin made up of blend of two or more PVOH polymers each having a monomodal molecular weight distribution, and the PVOH resin characterized by a viscosity in a range of about 13.5 cP to about 20 cP (or a corresponding weight average molecular weight), a degree of hydrolysis of about 84% to about 92%, a polydispersity index value in a range of about 1 to about 5, a residual water content of about 4 wt. % to about 10 wt. %, and a Resin Selection Index value in a range of 0.255 to 0.315; methods of making the films; compositions including PVOH resins for making the films; and pouch and packet articles made from the films.

20 Claims, 3 Drawing Sheets

(56) References Cited

U.S. PATENT DOCUMENTS

| | | |
|---|---|---|
| 2006/0216424 A1 | 9/2006 | Maurer et al. |
| 2006/0293203 A1 | 12/2006 | De Dominicis et al. |
| 2007/0135561 A1 | 6/2007 | Rath et al. |
| 2007/0219111 A1 | 9/2007 | Ward et al. |
| 2007/0241022 A1* | 10/2007 | Denome et al. ............ 206/524.7 |
| 2007/0267317 A1 | 11/2007 | Van Der Schaaf et al. |
| 2007/0269651 A1* | 11/2007 | Denome et al. ............... 428/327 |
| 2008/0020220 A1 | 1/2008 | Maurer et al. |
| 2008/0146481 A1 | 6/2008 | Brown et al. |
| 2009/0123679 A1 | 5/2009 | Denome et al. |
| 2011/0023240 A1 | 2/2011 | Fossum et al. |

FOREIGN PATENT DOCUMENTS

| | | |
|---|---|---|
| EP | 0414549 B1 | 12/1994 |
| FR | 2743567 A1 | 7/1997 |
| GB | 1137741 | 12/1968 |
| GB | 1466799 | 3/1977 |
| JP | 2003-206380 A | 7/2003 |
| WO | WO 92/01037 A1 | 1/1992 |
| WO | WO 94/22800 | 10/1994 |
| WO | WO02/16205 A1 | 2/2002 |
| WO | WO 2004/003127 A1 | 1/2004 |
| WO | WO 2009/098659 | 8/2009 |
| WO | WO 2009/152031 | 12/2009 |
| WO | WO 2010/141301 | 12/2010 |

OTHER PUBLICATIONS

International Search Report 12 Pages, PCT/US2011/023180 mailed on Apr. 29, 2011.
U.S. Appl. No. 13/016,612, filed Jan. 28, 2011, Denome, et al.
U.S. Appl. No. 13/016,621, filed Jan. 28, 2011, Denome, et al.
U.S. Appl. No. 13/017,382, filed Jan. 31, 2011, Denome, et al.

* cited by examiner

| | |
|---|---|
| Grade 0: no residues |  |
| Grade 1: max 3 small spread spots of max. 2cm diameter each, spots are flat and transparent |  |
| Grade 2: more then 3 small spots of 2 cm diameter each up to full Black pouch is covered with flat transparent film |  |
| Grade 2.5: Small opaque residue (soft PVOH) less then 1 cm diameter. | |

| | |
|---|---|
| Grade 3: opaque residue with a diameter between 1 and 2 cm (concentrated PVOH film) | |
| Grade 4: opaque residue with diameter between 3 and 4 cm diameter (concentrated PVOH film) | |
| Grade 5: thick residue with diameter between 4-6 cm diameter (+/- half of the packet is not dissolved) | |

FIG. 2

| | |
|---|---|
| Grade 6: Lump of concentrated soft PVOH residue with a diameter <6 cm, more than half of the packet was not dissolved. |  |
| Grade 7: Full packet not dissolved, PVOH is soft |  |

WATER-SOLUBLE FILM HAVING BLEND OF PVOH POLYMERS, AND PACKETS MADE THEREFROM

CROSS REFERENCE TO RELATED APPLICATION

The benefit of the priority to U.S. Provisional Patent Applications 61/299,836 and 61/299,834, both filed on 29 Jan. 2010, is claimed and each is incorporated herein by reference in its entirety.

FIELD OF THE DISCLOSURE

The disclosure relates generally to water-soluble films used for contact with liquids, methods of making the films, packets and pouches made from the films, which are optionally filled with active components, such as detergents, to make measured dose pouches. More particularly, the disclosure relates to such films, packets, and pouches with a combination of improved wet handling characteristics, improved cold water-solubility, and suitable processability.

BACKGROUND

Water-soluble polymeric films are commonly used as packaging materials to simplify dispersing, pouring, dissolving and dosing of a material to be delivered. For example, packets made from water-soluble film are commonly used to package household care compositions, e.g., a pouch containing a laundry or dish detergent. A consumer can directly add the pouch to a mixing vessel, such as a bucket, sink or washing machine. Advantageously, this provides for accurate dosing while eliminating the need for the consumer to measure the composition. The pouch may also reduce mess that would be associated with dispensing a similar composition from a vessel, such as pouring a liquid laundry detergent from a bottle. In sum, soluble polymeric film packets containing pre-measured agents provide for convenience of consumer use in a variety of applications.

Some water-soluble polymeric films that are used to make packets will incompletely dissolve during the wash cycle, leaving film residue on items within the wash. Such problems may particularly arise when the pouch is used under stressed wash conditions, such as when the pouch is used in cold water, i.e. water at as low as 5° C. Notably, environmental concerns and energy cost are driving consumer desire for utilizing colder wash water.

Alternatively, water-soluble polymeric films that completely dissolve in cold water can be too sensitive to moisture and humidity to make pouches for the consumer market. For example, high humidity or water droplets from handling of the pouches with wet hands can cause the soluble packets to stick together and/or dissolve through the packets and cause leakage of pouch contents.

Packets made from some films comprising polyvinyl alcohol polymers have addressed the aforementioned issues with some success. However, the cold water solubility of some polyvinyl alcohol films may decrease when they are in contact with certain detergent compositions. Without being bound by theory, it is believed that the film becomes less soluble due to chemical interactions between the film and the composition inside the pouch. Consequently, as they age, the packets may incompletely dissolve during a cold wash cycle, and may in turn leave film residue on items within the wash.

Packets made from water-soluble films comprising polymers other than polyvinyl alcohol polymers may fail to successfully address each the aforementioned problems. For example, a polymeric film comprising starch and/or cellulosics may provide good water-drop resistance. Yet, to achieve good cold water solubility, such a film may have to be so thin that its mechanical properties, including those relating to processability, are compromised. Moreover, films comprising starch and/or cellulosics are not nearly as readily processable given their relative lack of mechanical stretchability or elongation as compared to films of like thickness comprising polyvinyl alcohol polymers.

No commercially available film currently performs adequately in these three situations. Thus, there remains a need for packets comprising water-soluble films having the desired characteristics of good cold water-solubility, water-drop resistance, and mechanical properties including, but not limited to, good processability.

SUMMARY

A first aspect of the present disclosure is a water-soluble film that comprises at least 50 wt. % of a water-soluble polyvinyl alcohol (PVOH) resin, the resin having a average viscosity of at least about 13.5 cP, 14 cP, 15 cP, 16 cP, or 17 cP and at most about 20 cP, 19 cP, 18 cP, 17.5 cP as a 4 wt. % aqueous solution at 20° C., for example in a range of about 13.5 cP to about 20 cP, or about 14 cP to about 19 cP, or about 16 cP to about 18 cP, or about 17 cP to about 17.5 cP; and a degree of hydrolysis of at least 84% or 85% and at most about 90%, 89%, 88%, or 87%, for example in a range of about 84% to about 90%, or 85% to 88%, or 86.5%; the resin further having no more than 30 wt. % of a PVOH polymer having an average viscosity less than about 11 cP and a polydispersity index in a range of about 1.8 to about 2.3.

A second aspect of the present disclosure is a water-soluble film that comprises about 4 to about 10 wt. % water, at least 50 wt. % of a PVOH resin, the resin comprising a blend of a first and a second PVOH polymer, the first PVOH polymer having a viscosity of at least 8 cP or 10 cP and at most 40 cP, 20 cP, or 15 cP, for example in a range of about 8 cP to about 40 cP, or about 10 cP to about 20 cP, or about 10 cP to about 15 cP; and the second PVOH polymer having a viscosity of at least 10 cP or 20 cP and at most 40 cP, 30 cP, or 25 cP, for example in a range of about 10 cP to about 40 cP, or about 20 cP to about 30 cP, or about 20 cP to about 25 cP; the viscosity of the first PVOH polymer being less than the viscosity of the second PVOH polymer, and the resin having no more than 30 wt. % of a PVOH polymer having an average viscosity less than about 11 cP and a polydispersity index in a range of about 1.8 to about 2.3.

A third aspect of the present disclosure is a water-soluble film that comprises about 4 to about 10 wt. % water, at least 50 wt. % of a PVOH resin, and optionally a plasticizer; the resin having a ($\overline{M}w$) in a range of about 50,000 to about 300,000 Daltons and a degree of hydrolysis in a range of about 84% to about 90%, or about 85% to about 88%; the resin further having no more than 30 wt. % of a PVOH polymer having a $\overline{M}w$ less than about 70,000 Daltons.

A fourth aspect of the present disclosure is a water-soluble film that comprises at least 50 wt. % of a PVOH resin having a Resin Selection Index value in a range of 0.255 to 0.315, or 0.260 to 0.310, or 0.265 to 0.305, or 0.270 to 0.300, or 0.275 to 0.295, preferably 0.270 to 0.300.

A fifth aspect of the present disclosure is a method of making a water-soluble film that has about 4 to about 10 wt. % water, at least 50 wt. % of a PVOH resin, and optionally a plasticizer, the method including forming a film from a PVOH resin having a average viscosity in a range of about 13.5 cP to about 20 cP and a degree of hydrolysis of at least 84% or 85% and at most about 92%, 89%, 88%, or 87%, for example in a range of about 84% to about 90%, or 85% to 88%, or 86.5%; the resin further having no more than 30 wt. % of a PVOH polymer having an average viscosity less than about 11 cP and a polydispersity index in a range of about 1.8 to about 2.3.

A sixth aspect of the present disclosure is a sealable pouch or a packet that comprises a PVOH film as described herein, for example in any one or more of the first through fifth aspects.

In any one of the embodiments of the sixth aspect, the PVOH film is disposed as an outer wall of the pouch or packet.

In any one of the embodiments of the sixth aspect, the pouch or packet can comprise a single sealed or sealable compartment or a plurality of sealed or sealable compartments, optionally with the outer walls of the entire pouch or packet comprising a PVOH film according to the disclosure, and further optionally with at least one inner wall also comprising a PVOH film according to the disclosure. The PVOH film or films forming the one or more outer walls of the pouch or packet can be the same as or different from the film or films forming one or more inner walls of a multicompartment pouch or packet, and optionally are the same.

In any one of the embodiments of the sixth aspect, the Resin Selection Index value of the PVOH resins in the PVOH film can be in a range of 0.255 to 0.315, or 0.260 to 0.310, or 0.265 to 0.305, or 0.270 to 0.300, or 0.275 to 0.295, preferably 0.270 to 0.300.

In one embodiment of the sixth aspect, the pouch comprises a first and a second sealed compartment. The second compartment is in a generally superposed relationship with the first sealed compartment such that the second sealed compartment and the first sealed compartment share a partitioning wall interior to the pouch.

In one embodiment of the sixth aspect, the pouch comprising a first and a second compartment further comprises a third sealed compartment. The third sealed compartment is in a generally superposed relationship with the first sealed compartment such that the third sealed compartment and the first sealed compartment share a partitioning wall interior to the pouch.

In some embodiments according to the sixth aspect, the first composition and the second composition are individually selected from liquids, and powders. For example, the embodiments can include the following combinations: liquid, liquid; liquid, powder; powder, powder; and powder, liquid.

In some embodiments according to the sixth aspect, the first, second and third compositions individually are individually selected from liquids, and powders. For example, the embodiments can include the following combinations: solid, liquid, liquid; solid, solid, liquid; and liquid, liquid, liquid.

In any one of the embodiments of the sixth aspect, the single compartment or plurality of sealed compartments contains a composition. The plurality of compartments may each contain the same or a different composition. The composition is selected from a liquid, solid or combination thereof. As used herein, "liquid" includes pastes, liquids, gels, foams or mousse. Non-limiting examples of liquids include light duty and heavy duty liquid detergent compositions, fabric enhancers, hard surface cleaning compositions, detergent gels commonly used for laundry and dishwashing, bleach and laundry additives, shampoos, body washes, and other personal care compositions. Gases, e.g., suspended bubbles or solids e.g. particles, may be included within the liquids. A "solid" as used herein includes powders, agglomerates or mixtures thereof. Non-limiting examples of solids include: micro-capsules; beads; noodles; and pearlised balls. Solids, e.g., solid composition(s), may provide a technical benefit including, but not limited to, through-the-wash benefits, pre-treatment benefits, and/or aesthetic effects.

In any one of the embodiment of the sixth aspect, the composition may be selected from the group of liquid light duty and liquid heavy duty liquid detergent compositions, powdered detergent compositions, dish detergent for hand washing and/or machine washing; hard surface cleaning compositions, fabric enhancers, detergent gels commonly used for laundry, and bleach and laundry additives, shampoos, and body washes, and other personal care compositions.

Further aspects and advantages will be apparent to those of ordinary skill in the art from a review of the following detailed description, taken in conjunction with the drawings. While the compositions, films, pouches, and packets described herein are susceptible to embodiments in various forms, the description hereafter includes specific embodiments with the understanding that the disclosure is illustrative, and is not intended to limit the invention to the specific embodiments described herein.

Optional features, such as specific components, compositional ranges thereof, substituents, conditions, and method steps, can be selected from the various examples provided herein.

BRIEF DESCRIPTION OF THE DRAWINGS

FIG. 2 of the drawings shows Wash-Residue results with corresponding values (Grades 3, 4, and 5).

DETAILED DESCRIPTION

Figure 1:
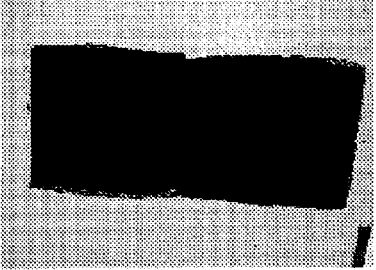
FIG. 1 of the drawings shows Wash-Residue results with corresponding values (Grades 0, 1, 2, and 2.5).
Figure 1:
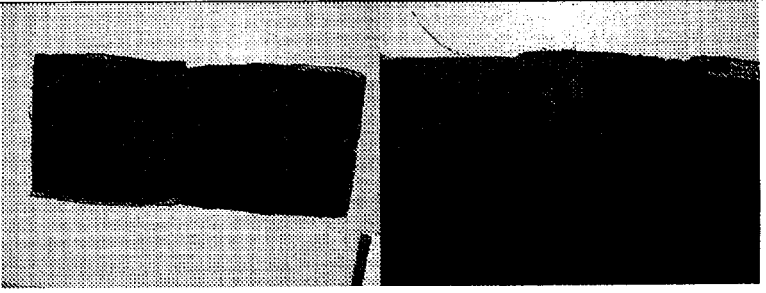
Figure 1:
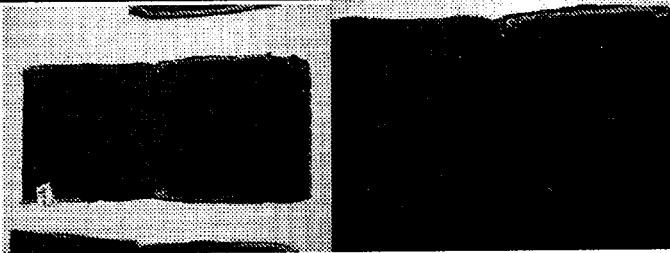
Figure 3:
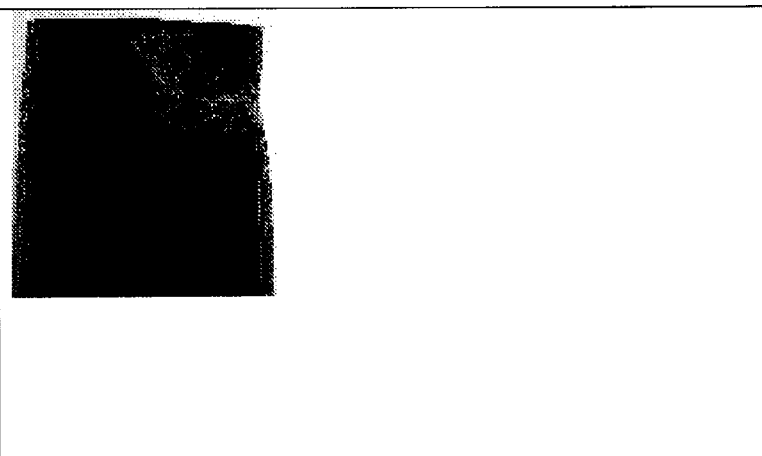
FIG. 3 of the drawings show Wash-Residue results with corresponding values (Grades 6 and 7).
Figure 3:
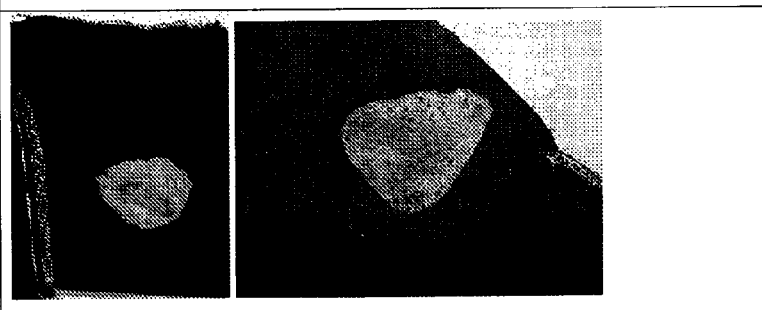
Figure 3:
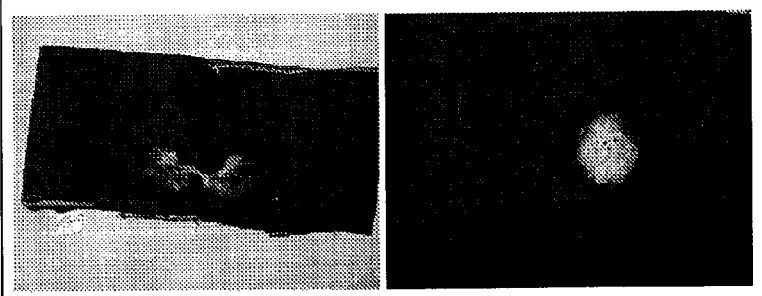
Figure 3:
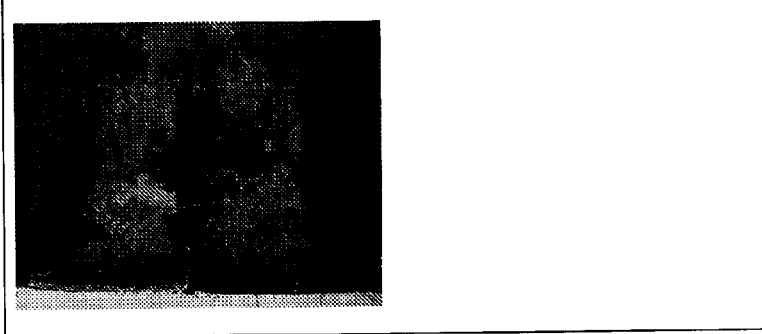

As used herein, the terms "wt. %" and "wt %" are intended to refer to the composition of the identified element in dry parts by weight of the entire film (when applicable) or parts by weight of the entire composition enclosed within a pouch (when applicable) unless specified otherwise.

All measurements made are at 25° C., unless otherwise specified. All such weights as they pertain to listed ingredients are based on the active level and therefore do not include carriers or by-products that may be included in commercially available materials, unless otherwise specified.

Film General Description

One problem addressed by embodiments of the disclosure herein is providing a film that dissolves readily in water, shows good residual moisture resistance, and is processable. High molecular weight PVOH polymers offer comparatively good residual moisture resistance but are poorly soluble in water and difficult to thermoform, in part due to thermal sensitivity of the PVOH polymer. Low molecular weight PVOH polymers offer good cold water solubility but are too reactive to residual moisture to function in a commercial or consumer setting, and are difficult to thermoform, in part, due to pin holing and subsequent seepage when filled with liquids or gels. Described herein is a PVOH polymer system and related film that unexpectedly solves all three problems.

The film, packets made using the film, and related methods are contemplated to include embodiments including any combination of one or more of the additional optional elements, features, and steps further described below, unless stated otherwise.

As used herein, the term "comprising" indicates the potential inclusion of other agents, elements, steps, or features, in addition to those specified.

As used herein, the terms packet(s) and pouch(es) should be considered interchangeable. In certain embodiments, the terms packet(s) and pouch(es), respectively, are used to refer to a container made using the film and a sealed container preferably having a material sealed therein, e.g. in the form a measured dose delivery system. The sealed pouches can be made from any suitable method, including such processes and features such as heat sealing, solvent welding, and adhesive sealing (e.g., with use of a water-soluble adhesive).

PVOH Resin Composition

The film-forming composition described herein includes one or more PVOH polymers to make up the PVOH resin content of the film. One or a plurality of PVOH polymers can be selected or blended by the teachings herein to create an article, such as a film, which is soluble in aqueous solutions. Such water-soluble films can find utility in, for example, creation of sealed pouches for delayed release of cleaning actives or rinse additives such as those found in laundry detergent compositions.

Polyvinyl alcohol is a synthetic resin generally prepared by the alcoholysis, usually termed hydrolysis or saponification, of polyvinyl acetate. Fully hydrolyzed PVOH, where virtually all the acetate groups have been converted to alcohol groups, is a strongly hydrogen-bonded, highly crystalline polymer which dissolves only in hot water—greater than about 140° F. (about 60° C.). If a sufficient number of acetate groups are allowed to remain after the hydrolysis of polyvinyl acetate, that is the PVOH polymer is partially hydrolyzed, then the polymer is more weakly hydrogen-bonded, less crystalline, and is generally soluble in cold water—less than about 50° F. (about 10° C.). As such, the partially hydrolyzed PVOH polymer is a vinyl alcohol-vinyl acetate copolymer, that is a PVOH copolymer. Thus, one or more water soluble, partially hydrolyzed PVOH copolymers are used in the compositions described.

The total PVOH resin content of the film can have a degree of hydrolysis of at least 80%, 84% or 85% and at most about 92%, 89%, 88%, or 87%, for example in a range of about 84% to about 90%, or 85% to 88%, or 86.5%. As used herein, the degree of hydrolysis is expressed as a percentage of vinyl acetate units converted to vinyl alcohol units.

The viscosity of a PVOH polymer (μ) is determined by measuring a freshly made solution using a Brookfield LV type viscometer with UL adapter as described in British Standard EN ISO 15023-2:2006 Annex E Brookfield Test method. It is international practice to state the viscosity of 4% aqueous polyvinyl alcohol solutions at 20° C. All viscosities specified herein in cP should be understood to refer to the viscosity of 4% aqueous polyvinyl alcohol solution at 20° C., unless specified otherwise. Similarly, when a resin is described as having (or not having) a particular viscosity, unless specified otherwise, it is intended that the specified viscosity is the average viscosity for the resin, which inherently has a corresponding molecular weight distribution. Depending on the PVOH resin the polydispersity index (PDI) of the resin may be in a range of about 1.5 to about 5, or greater. The PDI of commercial PVOH polymers typically are in a range of about 1.8 to about 2.3, and typical commercial PVOH polymers may have a PDI of as low as 1.7 and as high as 2.9. These commercial PVOH polymers are typically distinguished based on a specified, nominal viscosity and a specified degree of hydrolysis; for example MOWIOL 13-88 has a specified, nominal viscosity of 13 cP and a specified degree of hydrolysis of 88%.

The PVOH resin can have a average viscosity of at least about 13.5 cP, 14 cP, 15 cP, 16 cP, or 17 cP and at most about 20 cP, 19 cP, 18 cP, 17.5 cP, for example in a range of about 13.5 cP to about 20 cP, or about 14 cP to about 19 cP, or about 16 cP to about 18 cP, or about 17 cP to about 17.5 cP. It is well known in the art that the viscosity of a PVOH polymer is correlated with the weight average molecular weight ($\overline{M}w$) of the same PVOH polymer, and often the viscosity is used as a proxy for the $\overline{M}w$. Therefore, teachings in the present disclosure regarding the effect of changes in the viscosity of the PVOH resin on the performance or characteristics of the water-soluble films, disclosed herein, correspondingly, apply to the effects of changes in the $\overline{M}w$ of the PVOH resin on the same properties.

Commercially available PVOH polymers typically have a polydispersity index (PDI) value of about 1.8 to about 2.2. The total PVOH resin content for use herein can have a PDI value of at least 1.3, 1.5, 1.8, 2, 2.5, 3, and at most 6, 5.5, 5, 4.5, 4, 3.5, for example in a range of about 1 to about 5, or about 2 to about 4.5, or at least 2.5, or at least 3, or in a range of about 2.5 to about 4.

Mixture of PVOH Polymers

The PVOH resin can include a mixture of PVOH polymers. For example, the PVOH resin can include at least two PVOH polymers, wherein as used herein the first PVOH polymer has a viscosity less than the second PVOH polymer. A first PVOH polymer can have a viscosity of at least about 8 cP, 10 cP, 12 cP, or 13 cP and at most about 40 cP, 20 cP, 15 cP, or 13 cP, for example in a range of about 8 cP to about 40 cP, or about 10 cP to about 20 cP, or about 10 cP to about 15 cP, or about 12 cP to about 14 cP, or 13 cP. Furthermore, a second PVOH polymer can have a viscosity of at least about 10 cP, 20 cP, or 22 cP and at most about 40 cP, 30 cP, 25 cP, or 24 cP, for example in a range of about 10 cP to about 40 cP, or 20 to about 30 cP, or about 20 to about 25 cP, or about 22 to about 24, or about 23 cP.

The individual PVOH polymers can have any suitable degree of hydrolysis, as long as the degree of hydrolysis of the PVOH resin is within the ranges described herein.

Optionally, the PVOH resin can, in addition or in the alternative, include a first PVOH polymer that has a $\overline{M}w$ in a range of about 50,000 to about 300,000 Daltons, or about 60,000 to about 150,000 Daltons; and a second PVOH polymer that has a $\overline{M}w$ in a range of about 60,000 to about 300,000 Daltons, or about 80,000 to about 250,000 Daltons.

The PVOH resin can still further include one or more additional PVOH polymers that have a viscosity in a range of about 10 to about 40 cP and a degree of hydrolysis in a range of about 84% to about 92%.

When the PVOH resin includes a first PVOH polymer having an average viscosity less than about 11 cP and a polydispersity index in a range of about 1.8 to about 2.3, then in one type of embodiment the PVOH resin contains less than about 30 wt. % of the first PVOH polymer. Similarly, when the PVOH resin includes a first PVOH polymer having an average viscosity less than about 11 cP and a polydispersity index in a range of about 1.8 to about 2.3, then in another, non-exclusive type of embodiment the PVOH resin contains less than about 30 wt. % of a PVOH polymer having a $\overline{M}w$ less than about 70,000 Daltons.

Of the total PVOH resin content in the film described herein, the PVOH resin can comprise about 10, 15, 20, 25, 30, 35, 40, 45, 50, 55, 60, 65, 70, 75, 80, 85, 90 wt. % of the first PVOH polymer, and about 10, 15, 20, 25, 30, 35, 40, 45, 50, 55, 60, 65, 70, 75, 80, 85, 90 wt. % of the second PVOH polymer, for example about 30 to about 85 wt. % of the first PVOH polymer, or about 45 to about 55 wt. % of the first PVOH polymer. For example, the PVOH resin can contain about 50 wt. % of each PVOH polymer, wherein the viscosity of the first PVOH polymer is about 13 cP and the viscosity of the second PVOH polymer is about 23 cP.

One type of embodiment is characterized by the PVOH resin including about 40 to about 85 wt. % of a first PVOH polymer that has a viscosity in a range of about 10 to about 15 cP and a degree of hydrolysis in a range of about 84% to about 92%. Another type of embodiment is characterized by the PVOH resin including about 45 to about 55 wt. % of the first PVOH polymer that has a viscosity in a range of about 10 to about 15 cP and a degree of hydrolysis in a range of about 84% to about 92%. The PVOH resin can include about 15 to about 60 wt. % of the second PVOH polymer that has a viscosity in a range of about 20 to about 25 cP and a degree of hydrolysis in a range of about 84% to about 92%. One contemplated class of embodiments is characterized by the PVOH resin including about 45 to about 55 wt. % of the second PVOH polymer.

When the PVOH resin includes a plurality of PVOH polymers the PDI value of the PVOH resin is greater than the PDI value of any individual, included PVOH polymer. Optionally, the PDI value of the PVOH resin is greater than 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.5, or 5.0.

Film Composition

The water-soluble film can contain at least about 50 wt. %, 55 wt. %, 60 wt. %, 65 wt. %, 70 wt. %, 75 wt. %, 80 wt. %, 85 wt. %, 90 wt. % of the PVOH resin.

In choosing the PVOH resin, it is desirable to choose a PVOH resin that has a PDI value greater than about 2, 2.2, 2.4, 2.6, 2.8, 3.0, 3.2, 3.4, 3.6, 3.8, 4.0, 4.2, 4.4, 4.6, 4.8, or 5.0; for example, the PDI value of the PVOH resin can be greater than the PDI value of any individual PVOH polymer included in the resin.

Furthermore, it is desirable to choose a PVOH resin that has a weighted, average degree of hydrolysis ($\overline{H}°$) between about 80 and about 92%, or between about 83 and about 90%, or about 85 and 89%. For example, $\overline{H}°$ for a PVOH resin that comprises two or more PVOH polymers is calculated by the formula $\overline{H}°=\Sigma(W_i \cdot H_i)$ where $W_i$ is the weight percentage of the respective PVOH polymer and and $H_i$ is the respective degrees of hydrolysis.

Still further it is desirable to choose a PVOH resin that has a weighted log average viscosity ($\overline{\mu}$) between about 10 and about 25, or between about 12 and 22, or between about 13.5 and about 20. The $\overline{\mu}$ for a PVOH resin that comprises two or more PVOH polymers is calculated by the formula $\overline{\mu}=e^{\Sigma W_i \cdot \ln \mu_i}$ where $\mu_i$ is the viscosity for the respective PVOH polymers.

Yet further, it is desirable to choose a PVOH resin that has a Resin Selection Index (RSI) in a range of 0.255 to 0.315, or 0.260 to 0.310, or 0.265 to 0.305, or 0.270 to 0.300, or 0.275 to 0.295, preferably 0.270 to 0.300. The RSI is calculated by the formula $\Sigma(W_i|\mu_i \mu_r|)/\Sigma(W_i \mu_i)$, wherein $\mu_r$ is seventeen, $\mu_i$ is the average viscosity each of the respective PVOH polymers, and $W_i$ is the weight percentage of the respective PVOH polymers.

Optionally, the water-soluble film preferably is a free-standing film consisting of one layer or a plurality of like layers. The water-soluble film can further optionally consist essentially of the PVOH resin and the plasticizers and additives as described herein, and be essentially free of other film layers which would affect solubility, thermoforming performance, or both solubility and thermoforming performance.

The PVOH resin portion of the film consists essentially of PVOH polymers (i.e., can include impurities present in an as-manufactured polymerized product, for example) or consists entirely of PVOH polymer. The water-soluble film can also comprise film-forming polymers in addition to the PVOH resin. These additional polymers can be present in the film at a weight percentage of about 0.1 to about 40%, or at about 1 to about 30%, based on the total weight of the film. Non-limiting examples include starch, cellulosic materials, sulfopolyesters and mixtures thereof. Further non-limiting examples include: polyalkylene oxides, polyacrylic acid, polyvinyl pyrrolidone, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatin, natural gums such as xanthan, and carrageenans.

The water-soluble film can contain other auxiliary agents and processing agents, such as, but not limited to, plasticizers, lubricants, release agents, fillers, extenders, cross-linking agents, antiblocking agents, antioxidants, detackifying agents, antifoams, nanoparticles such as layered silicate-type nanoclays (e.g., sodium montmorillonite), bleaching agents (e.g., sodium metabisulfite, sodium bisulfite or others), and other functional ingredients, in amounts suitable for their intended purposes. Embodiments including plasticizers are preferred. The amount of such agents can be up to about 50 wt. %, up to about 20 wt %, or up to 15 wt %, or up to about 10 wt %, or up to about 5 wt. %, e.g., up to 4 wt %, individually or collectively.

The plasticizer can include, but is not limited to, glycerin, diglycerin, sorbitol, ethylene glycol, diethylene glycol, triethylene glycol, tetraethylene glycol, propylene glycol, polyethylene glycols up to 400 MW, neopentyl glycol, trimethylolpropane, polyether polyols, sorbitol, 2-methyl-1,3-propanediol, ethanolamines, and a mixture thereof. A preferred plasticizer is glycerin, sorbitol, triethyleneglycol, propylene glycol, 2-methyl-1,3-propanediol, trimethylolpropane, or a combination thereof. The total amount of the plasticizer can be in a range of about 10 wt. % to about 40 wt. %, or about 15 wt. % to about 35 wt. %, or about 20 wt. % to about 30 wt. %, for example about 25 wt. %. Combinations of glycerin, propylene glycol, and sorbitol can be used. Optionally, glycerin can be used in an amount of about 5 wt % to about 30 wt %, or 5 wt % to about 20 wt %, e.g., about 13 wt %. Optionally, propylene glycol can be used in an amount of about 1 wt. % to about 20 wt. %, or about 3 wt. % to about 10 wt. %, for example 6 wt. %. Optionally, sorbitol can be used in an amount of about 1 wt % to about 20 wt %, or about 2 wt % to about 10 wt %, e.g., about 5 wt %.

Suitable surfactants can include the nonionic, cationic, anionic and zwitterionic classes. Preferably, the surfactants will be of the nonionic, cationic or zwitterionic classes or combinations of these. Suitable surfactants include, but are not limited to, polyoxyethylenated polyoxypropylene glycols, alcohol ethoxylates, alkylphenol ethoxylates, tertiary acetylenic glycols and alkanolamides (nonionics), polyoxyethylenated amines, quaternary ammonium salts and quaternized polyoxyethylenated amines (cationics), and amine oxides, N-alkylbetaines and sulfobetaines (zwitterionics).

Preferred surfactants are alcohol ethoxylates, quaternary ammonium salts and amine oxides. In one type of embodiment, the amount of surfactant in the water-soluble film is in a range of about 1.0 wt % to 2.5 wt %, optionally about 1.0 wt % to 2.0 wt %.

Suitable lubricants/release agents can include, but are not limited to, fatty acids and their salts, fatty alcohols, fatty esters, fatty amines, fatty amine acetates and fatty amides. Preferred lubricants/release agents are fatty acids, fatty acid salts, and fatty amine acetates. In one type of embodiment, the amount of lubricant/release agent in the water-soluble film is in a range of about 0.02 wt % to about 1.5 wt %, optionally about 0.1 wt % to about 1 wt %.

Suitable fillers/extenders/antiblocking agents/detackifying agents include, but are not limited to, starches, modified starches, crosslinked polyvinylpyrrolidone, crosslinked cellulose, microcrystalline cellulose, silica, metallic oxides, calcium carbonate, talc and mica. Preferred materials are starches, modified starches and silica. In one type of embodiment, the amount of filler/extender/antiblocking agent/detackifying agent in the water-soluble film is in a range of about 0.1 wt % to about 25 wt %, or about 1 wt % to about 10 wt %, or about 2 wt. % to about 8 wt. %, or about 3 wt. % to about 5 wt. %. In the absence of starch, one preferred range for a suitable filler/extender/antiblocking agent/detackifying agent is about 1 wt % to about 6 wt %, or about 1 wt. % to about 4 wt. %, or about 1 wt. % to about 2.5 wt. %.

Suitable antifoams include, but are not limited to, those based on polydimethylsiloxanes and hydrocarbon blends. In one type of embodiment, the amount of antifoam in the water-soluble film is in a range of about 0.001 wt. % to about 1.0 wt. %, or about 0.1 wt. % to 0.75 wt. %, or about 0.1 wt. % to about 0.6 wt. %, or about 0.4 wt. % to about 0.5 wt. %.

The water-soluble film can further have a residual moisture content of at least 4 wt. %, for example in a range of about 4 to about 10 wt. %, as measured by Karl Fischer titration.

Film Characteristics

One contemplated class of embodiments is characterized by the water-soluble film described herein passing the Water-Drop Resistance Test, described herein, and the Wash-Residue Test, described herein, and, preferably passing both tests. Another contemplated class of embodiments is characterized by good thermoformability of a the water-soluble film made as described herein. A thermoformable film is one that can be shaped through the application of heat and a force. Preferably, the film will pass the Water-Drop Resistance Test and the Wash-Residue Test, and will be thermoformable.

The Wash-Residue Test qualitatively measures the residual polymer after the water-soluble polymer is subjected to a cold water wash cycle. Specifically, 0.7 g of a 76 μm thick PVOH film is thermoformed to a single compartment pouch, measuring about 60×60 mm, and the pouch is filled with about 37.5 ml 138 g of a test solution that includes:

| Ingredients | Wt % of Test Composition |
| --- | --- |
| Linear $C_9$-$C_{15}$ Alkylbenzene sulfonic acid | 23.2 |
| $C_{12-14}$ alkyl 7-ethoxylate | 19.1 |
| Citric Acid | 0.6 |
| Top palm kernel fatty acid | 10.8 |
| Propane diol | 14.0 |
| Glycerol | 5.7 |
| Hydroxyethane diphosphonic acid (Dequest 2010) | 1.2 |
| Magnesium Chloride | 0.2 |
| Enzymes | 1.6 |
| Ethoxysulfated Hexamethylene Diamine Dimethyl Quat | 3.9 |
| $K_2SO_3$ | 0.2 |
| Perfume | 1.7 |
| Hydrogenated castor oil | 0.14 |
| Water | 8.5 |
| Monoethanol amine | 8.8 |
| Minor | To 100% |

Alternatively, 0.6 g of a 76 μm thick PVOH film is thermoformed to a three component pouch, measuring about 44×44 mm, that is filled with about 17.5 ml/18 g of the test solution in the first compartment and about 1.5 ml/1.5 g of the test solution in the second and third compartments. The sealed packet is then secured within a black velvet bag (23.5 cm×47 cm of 72% Cotton/28% black velvet, preferably Modal black velvet supplied by EQUEST U.K. and produced by DENHOLME VELVETS, Halifax Road, Denholme, Bradford, West Yorkshire, England) by stitching along the whole length of the bag opening side with a plastic thread. The sealed velvet bag is then placed at the bottom of a washing machine drum (preferably a MIELE washing machine type W467 connected to a water temperature control system). To overcome machine-to-machine variation, preferably four machines should be used in each test with four samples of water-soluble polymer each secured within a velvet bag in each machine. The bags should be placed side-to-side in the bottom of the machine with different relative positions within each machine to avoid any effect of the positioning of the bag in the machine. The washing cycle is then engaged on a "wool cycle/cold" setting with a starting water temperature of 5° C.±1° C. (controlled by a water temperature control system) without any additional ballast load. At end of the washing cycle, the bag should be removed from the machine, opened and graded within fifteen minutes.

Grading is made by visual observation of the residue remaining in/on the bag after the wash. The qualitative scale is 0 (no residues) to 7 (the whole of the polymer film remains in the bag). The film can be characterized by a wash-residue value of at most about 4.5, 4.0, 3.5, 3.0, 2.9, or 2.8, preferably at most about 2.7, 2.6, 2.5, 2.4, 2.3, 2.2, 2.1, or 2.0. A water-soluble polymer film passes the Wash-Residue Test if the average residue grading for the sixteen trials is less than 4.5, preferably less than 3. The following scale, and the corresponding photographs, was used for determining the wash-residue value:

Grade 0: No residues
Grade 1: Maximum of 3 small spread spots of max. 2 cm diameter each, spots are flat and transparent
Grade 2: More than 3 small spots of 2 cm diameter each up to full Black pouch is covered with flat transparent film
Grade 2.5: Small opaque residue (soft PVOH) less than 1 cm diameter.
Grade 3: Opaque residue with a diameter between 1 and 2 cm (concentrated PVOH film)
Grade 4: Opaque residue with diameter between 3 and 4 cm diameter (concentrated PVOH film)
Grade 5: Thick residue with diameter between 4-6 cm diameter (+/−half of the pouch is not dissolved)

Grade 6: Lump of concentrated soft PVOH residue with a diameter <6 cm, more than half of the pouch was not dissolved.

Grade 7: Full pouch not dissolved, PVOH is soft

The Water-Drop Resistance Test measures the ability of the water-soluble polymer film to remain intact upon contact with aqueous water for a preset period of time, e.g., 10 minutes. The Test is conducted on a thermoformed pouch made by enclosing the test solution within a 2 mil (51 µm) thick packet, that is made by thermoforming a 3 mil (76 µm) thick water-soluble film. In order to have a representative measurement 50 pouches are preferred and to minimize variability across different test runs, it is preferred to conduct the test in a temperature and humidity controlled room (about 21° C., 40-60% relative humidity (RH)). To start from a standardized film, pouches should be conditioned at about 35±0.5° C., 45% RH for 5 days. Pouches made from a first non-deformed film and a second, thermoformed film (e.g., as is known in the art, e.g. U.S. Patent Application Publication 2005/0183394 A1) are positioned with the non-deformed film on top. The pouches are placed on a tray and conditioned for 24 hours at about 21° C., 40-60% RH. After being turned so that bottom, deformed film is on top, the pouches are again conditioned for at least 15 min at about 21° C./40-60% RH. The preconditioning process allows the pouches to equilibrate with ambient conditions and avoids variability in the test results. Then 2 µL of water (CONTREX Natural Mineral Water diluted 10 fold with demineralized water and equilibrated to about 21° C.) is placed under the middle of the bottom part of the pouch with a micropipette. After 10 min, the pouch is checked by gently lifting it and noting any leakage of liquid. The result of the test is given as a percentage of pouches that leaked after 10 min. A water-soluble film passes the Water-Drop Resistance Test if fewer than 60% of pouches made from a water-soluble polymer film as described herein leak. Preferred films can be characterized by a water-drop resistance value of at most about 60%, 50%, 45%, 40%, or 35%.

Thermoforming a film is the process of heating the film, shaping it in a mold, and then allowing the film to cool, whereupon the film will hold the shape of the mold. Thermoforming can be performed by any one or more of the following processes: the manual draping of a thermally softened film over a mold, or the pressure induced shaping of a softened film to a mold (e.g., vacuum forming), or the automatic high-speed indexing of a freshly extruded sheet having an accurately known temperature into a forming and trimming station, or the automatic placement, plug and/or pneumatic stretching and pressuring forming of a film. The extent of the film stretch is defined by the areal draw ratio which is the pocket (or cavity) surface area divided by the film surface area before thermoforming. The areal draw ratio (also called areal depth of draw) can be calculated according to the method described in Technology of Thermoforming, James L. Throne, Hanser publisher, (1996) Chapter 7.4, pg 488-494 (ISBN 3-446-17812-0). Herein for thermoformed films, the areal draw ratio can be between 1.05 and 2.7; preferably in a range of 1.2 to 2.3; most preferably in a range of 1.3 to 2.0.

The films described herein preferably are thermoformable. Herein, a film is thermoformable (passes a Thermoforming Converting Test) if the molded film obtained after a thermoforming process has a Pinhole Test Result of less than 2%, preferably less than 1%, and more preferably less than 0.5%. The molded film obtained after a thermoforming process optionally can have a Pressurized Pinhole Test Result of less than 4%, preferably, less than 2%, and more preferably less than 1%.

The Pinhole Test can be conducted on a film with a starting thickness in a range of 25 to 150 µm, preferably in a range of 50 to 100 µm, most preferably in a range of 60 to 90 µm. The thickness of the film can be measured with any technique known by one skilled in the art. For example, this can be achieved using the electronic thickness tester, Thwing-Albert model 89-100 (Thwing-Albert; 14W. Collings Avenue, West Berlin N.J. 08091 USA). It is required that the film is conditioned at 22±5° C. and 40±20% relative humidity for at least 24 hours prior to the thickness measurement. A sheet of film of about 60 mm width by about 60 mm length is obtained and 25 measurements are obtained (spaced throughout the sheet). The thickness is thus the average of the 25 measurements+/− standard deviation.

The Pinhole Test and the Pressurized Pinhole Test measure the leakage percentage of pouches that include the thermoformed film as at least one side of the pouch. The preparation of samples for testing includes the process for preparing a water-soluble container from PVOH film by thermoforming the PVOH film into a pocket, filling the pocket with a composition, placing a second film on top of the filled pocket and sealing the two film together. The sealing can be done by any suitable method. For example, the sealing can be performed as disclosed in WO 02/16205, the disclosure of which is incorporated herein. Here, a film with a thickness of 76 µm±4 µm is thermoformed at 105±15° C. into a cavity with an areal draw ratio of 2.0 at atmospheric conditions of 22±5° C. and 40±20% RH, to form a thermoformed film having a minimum thickness of 30 µm±5 µm. The thermoformed film is then filled with a test solution that includes the materials in Table 1, and sealed to form a pouch.

TABLE 1

|  | Wt % |
|---|---|
| Linear $C_9$-$C_{15}$ Alkylbenzene sulfonic acid | 24 |
| $C_{12-14}$ alkyl 7-ethoxylate | 20.8 |
| Citric Acid | 0.6 |
| Top palm kernel fatty acid | 14.8 |
| Propane diol | 14.2 |
| Glycerol | 5.0 |
| Hydroxyethane diphosphonic acid (Dequest 2010) | 1.2 |
| Magnesium Chloride | 0.2 |
| $K_2SO_3$ | 0.4 |
| Water | 9.4 |
| Monoethanol amine | 9.0 |
| Minor | To 100% |

Next, the pouches are individually laid upon absorbing paper with the thermoformed film in contact with the absorbing paper, for 24 hours at 22±5° C. and 40±20% RH. After 24 hours, all the pouches that have leaked on the thermoformed portion of film (in contrast to leaking through the seal or through a defect created by the sealing process) are counted. The percentage of pouches with pinholes is then determined by the ((number of leaked pouches)/total number of pouches)*100%. Preferably, about five hundred pouches are manufactured and tested. Notably, applying pressure to the sealed pouch can facilitate the discovery of pinholes. Thereby, the Pressurized Pinhole Test follows the same process as the Pinhole Test with the added step that after the pouch is placed on the absorbing paper a weight (about 0.1 $N/cm^2$) is placed upon the pouch.

Method of Making the Film

One contemplated class of embodiments is characterized by the water-soluble film being formed by, for example, admixing, co-casting, or welding the first PVOH polymer and the second PVOH polymer. If the polymers are first admixed then the water-soluble film is preferably formed by casting the resulting admixture to form a film. If the polymers are welded, the water-soluble film can be formed by, for example, solvent or thermal welding.

The film is useful for creating a packet to contain a detergent composition comprising cleaning actives thereby forming a pouch. The cleaning actives may take any form such as powders, gels, pastes, liquids, tablets or any combination thereof. The film is also useful for any other application in which improved wet handling and low cold water residues are desired. The film forms at least one side wall of the pouch and/or packet, optionally the entire pouch and/or packet, and preferably an outer surface of the at least one sidewall.

The film described herein can also be used to make a packet with two or more compartments made of the same film or in combination with films of other polymeric materials. Additional films can, for example, be obtained by casting, blow-molding, extrusion or blown extrusion of the same or a different polymeric material, as known in the art. In one type of embodiment, the polymers, copolymers or derivatives thereof suitable for use as the additional film are selected from polyvinyl alcohols, polyvinyl pyrrolidone, polyalkylene oxides, polyacrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatin, natural gums such as xanthan, and carrageenans. For example, polymers can be selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and combinations thereof, or selected from polyvinyl alcohols, polyvinyl alcohol copolymers and hydroxypropyl methyl cellulose (HPMC), and combinations thereof. One contemplated class of embodiments is characterized by the level of polymer in the packet material, for example the PVOH resin, as described above, being at least 60%.

Pouches

The pouches of the present disclosure comprise at least one sealed compartment. Thus the pouches may comprise a single compartment or multiple compartments. In embodiments comprising multiple compartments, each compartment may contain identical and/or different compositions. In turn, the compositions may take any suitable form including, but not limited to liquid, solid and combinations thereof (e.g. a solid suspended in a liquid). In some embodiments, the pouches comprises a first, second and third compartment, each of which respectively contains a different first, second and third composition. In some embodiments, the compositions may be visually distinct as described in European Patent Application Number 09161692.0 (filed Jun. 2, 2009 and assigned to the Procter & Gamble Company).

The compartments of multi-compartment pouches may be of the same or different size(s) and/or volume(s). The compartments of the present multi-compartment pouches can be separate or conjoined in any suitable manner. In some embodiments, the second and/or third and/or subsequent compartments are superimposed on the first compartment. In one embodiment, the third compartment may be superimposed on the second compartment, which is in turn superimposed on the first compartment in a sandwich configuration. Alternatively the second and third compartments may be superimposed on the first compartment. However it is also equally envisaged that the first, second and optionally third and subsequent compartments may be attached to one another in a side by side relationship. The compartments may be packed in a string, each compartment being individually separable by a perforation line. Hence each compartment may be individually torn-off from the remainder of the string by the end-user, for example, so as to pre-treat or post-treat a fabric with a composition from a compartment.

In some embodiments, multi-compartment pouches comprise three compartments consisting of a large first compartment and two smaller compartments. The second and third smaller compartments are superimposed on the first larger compartment. The size and geometry of the compartments are chosen such that this arrangement is achievable. The geometry of the compartments may be the same or different. In some embodiments the second and optionally third compartment each has a different geometry and shape as compared to the first compartment. In these embodiments, the second and optionally third compartments are arranged in a design on the first compartment. The design may be decorative, educative, or illustrative, for example to illustrate a concept or instruction, and/or used to indicate origin of the product. In some embodiments, the first compartment is the largest compartment having two large faces sealed around the perimeter, and the second compartment is smaller covering less than about 75%, or less than about 50% of the surface area of one face of the first compartment. In embodiments in which there is a third compartment, the aforementioned structure may be the same but the second and third compartments cover less than about 60%, or less than about 50%, or less than about 45% of the surface area of one face of the first compartment.

The pouches and/or packets of the present disclosure may comprise one or more different films. For example, in single compartment embodiments, the packet may be made from one wall that is folded onto itself and sealed at the edges, or alternatively, two walls that are sealed together at the edges. In multiple compartment embodiments, the packet may be made from one or more films such that any given packet compartment may comprise walls made from a single film or multiple films having differing compositions. In one embodiment, a multi-compartment pouch comprises at least three walls: an outer upper wall; an outer lower wall; and a partitioning wall. The outer upper wall and the outer lower wall are generally opposing and form the exterior of the pouch. The partitioning wall is interior to the pouch and is secured to the generally opposing outer walls along a seal line. The partitioning wall separates the interior of the multi-compartment pouch into at least a first compartment and a second compartment.

Pouches and packets may be made using any suitable equipment and method. For example, single compartment pouches may be made using vertical form filling, horizontal form filling, or rotary drum filling techniques commonly known in the art. Such processes may be either continuous or intermittent. The film may be dampened, and/or heated to increase the malleability thereof. The method may also involve the use of a vacuum to draw the film into a suitable mold. The vacuum drawing the film into the mold can be applied for about 0.2 to about 5 seconds, or about 0.3 to about 3, or about 0.5 to about 1.5 seconds, once the film is on the horizontal portion of the surface. This vacuum can be such that it provides an under-pressure in a range of 10 mbar to 1000 mbar, or in a range of 100 mbar to 600 mbar, for example.

The molds, in which packets may be made, can have any shape, length, width and depth, depending on the required dimensions of the pouches. The molds may also vary in size and shape from one to another, if desirable. For example, the volume of the final pouches may be about 5 ml to about 300 ml, or about 10 to 150 ml, or about 20 to about 100 ml, and that the mold sizes are adjusted accordingly.

Shaping and Thermoforming

Heat can be applied to the film in the process commonly known as thermoforming. The heat may be applied using any suitable means. For example, the film may be heated directly by passing it under a heating element or through hot air, prior to feeding it onto a surface or once on a surface. Alternatively, it may be heated indirectly, for example by heating the surface or applying a hot item onto the film. In some embodiments, the film is heated using an infrared light. The film may be heated to a temperature of about 50 to about 150° C., about 50 to about 120° C., about 60 to about 130° C., about 70 to about 120° C., or about 60 to about 90° C. Alternatively, the film can be wetted by any suitable means, for example directly by spraying a wetting agent (including water, a solution of the film composition, a plasticizer for the film composition, or any combination of the foregoing) onto the film, prior to feeding it onto the surface or once on the surface, or indirectly by wetting the surface or by applying a wet item onto the film.

Once a film has been heated and/or wetted, it may be drawn into an appropriate mold, preferably using a vacuum. The filling of the molded film can be accomplished by utilizing any suitable means. In some embodiments, the most preferred method will depend on the product form and required speed of filling. In some embodiments, the molded film is filled by in-line filling techniques. The filled, open packets are then closed forming the pouches, using a second film, by any suitable method. This may be accomplished while in horizontal position and in continuous, constant motion. The closing may be accomplished by continuously feeding a second film, preferably water-soluble film, over and onto the open packets and then preferably sealing the first and second film together, typically in the area between the molds and thus between the packets.

Any suitable method of sealing the packet and/or the individual compartments thereof may be utilized. Non-limiting examples of such means include heat sealing, solvent welding, solvent or wet sealing, and combinations thereof. Typically, only the area which is to form the seal is treated with heat or solvent. The heat or solvent can be applied by any method, typically on the closing material, and typically only on the areas which are to form the seal. If solvent or wet sealing or welding is used, it may be preferred that heat is also applied. Preferred wet or solvent sealing/welding methods include selectively applying solvent onto the area between the molds, or on the closing material, by for example, spraying or printing this onto these areas, and then applying pressure onto these areas, to form the seal. Sealing rolls and belts as described above (optionally also providing heat) can be used, for example.

The formed pouches may then be cut by a cutting device. Cutting can be accomplished using any known method. It may be preferred that the cutting is also done in continuous manner, and preferably with constant speed and preferably while in horizontal position. The cutting device can, for example, be a sharp item or a hot item, whereby in the latter case, the hot item 'burns' through the film/sealing area.

The different compartments of a multi-compartment pouches may be made together in a side-by-side style wherein the resulting, cojoined pouches may or may not be separated by cutting. Alternatively, the compartments can be made separately.

In some embodiments, pouches may be made according to a process comprising the steps of:
  a) forming a first compartment (as described above);
  b) forming a recess within some or all of the closed compartment formed in step (a), to generate a second molded compartment superposed above the first compartment;
  c) filling and closing the second compartments by means of a third film;
  d) sealing the first, second and third films; and
  e) cutting the films to produce a multi-compartment pouch.

The recess formed in step (b) may be achieved by applying a vacuum to the compartment prepared in step (a).

In some embodiments, second, and/or third compartment(s) can be made in a separate step and then combined with the first compartment as described in European Patent Application Number 08101442.5 or WO 2009/152031 (filed Jun. 13, 2008 and assigned to the Procter & Gamble Company).

In some embodiments, pouches may be made according to a process comprising the steps of:
  a) forming a first compartment, optionally using heat and/ or vacuum, using a first film on a first forming machine;
  b) filling the first compartment with a first composition;
  c) on a second forming machine, deforming a second film, optionally using heat and vacuum, to make a second and optionally third molded compartment;
  d) filling the second and optionally third compartments;
  e) sealing the second and optionally third compartment using a third film;
  f) placing the sealed second and optionally third compartments onto the first compartment;
  g) sealing the first, second and optionally third compartments; and
  h) cutting the films to produce a multi-compartment pouch.

The first and second forming machines may be selected based on their suitability to perform the above process. In some embodiments, the first forming machine is preferably a horizontal forming machine, and the second forming machine is preferably a rotary drum forming machine, preferably located above the first forming machine.

It should be understood that by the use of appropriate feed stations, it may be possible to manufacture multi-compartment pouches incorporating a number of different or distinctive compositions and/or different or distinctive liquid, gel or paste compositions.

Description of Pouch Fill Material

The present pouches may contain various compositions. A multi-compartment pouch may contain the same or different compositions in each separate compartment. This feature of the disclosure may be utilized to keep compositions containing incompatible ingredients (e.g., bleach and enzymes) physically separated or partitioned from each other. It is believed that such partitioning may expand the useful life and/or decrease physical instability of such ingredients. Additionally or alternatively, such partitioning may provide aesthetic benefits as described in European Patent Application Number 09161692.0 (filed Jun. 2, 2009 and assigned to the Procter & Gamble Company).

Non-limiting examples of useful compositions include light duty and heavy duty liquid detergent compositions, hard surface cleaning compositions, detergent gels commonly used for laundry, and bleach and laundry additives, shampoos, body washes, and other personal care compositions.

Compositions of use in the present pouches may take the form of a liquid, solid or a powder. Liquid compositions may comprise a solid. Solids may include powder or agglomerates, such as micro-capsules, beads, noodles or one or more pearlized balls or mixtures thereof. Such a solid element may provide a technical benefit, through the wash or as a pre-treat, delayed or sequential release component; additionally or alternatively, it may provide an aesthetic effect.

In pouches comprising laundry, laundry additive and/or fabric enhancer compositions, the compositions may comprise one or more of the following non-limiting list of ingredients: fabric care benefit agent; detersive enzyme; deposition aid; rheology modifier; builder; bleach; bleaching agent; bleach precursor; bleach booster; bleach catalyst; perfume and/or perfume microcapsules (see for example U.S. Pat. No. 5,137,646); perfume loaded zeolite; starch encapsulated accord; polyglycerol esters; whitening agent; pearlescent agent; enzyme stabilizing systems; scavenging agents including fixing agents for anionic dyes, complexing agents for anionic surfactants, and mixtures thereof; optical brighteners or fluorescers; polymer including but not limited to soil release polymer and/or soil suspension polymer; dispersants; antifoam agents; non-aqueous solvent; fatty acid; suds suppressors, e.g., silicone suds suppressors (see: U.S. Publication No. 2003/0060390 A1, ¶65-77); cationic starches (see: US 2004/0204337 A1 and US 2007/0219111 A1); scum dispersants (see: US 2003/0126282 A1, ¶89-90); dyes; colorants; opacifier; antioxidant; hydrotropes such as toluenesulfonates, cumenesulfonates and naphthalenesulfonates; color speckles; colored beads, spheres or extrudates; clay softening agents. Any one or more of these ingredients is further described in described in European Patent Application Number 09161692.0 (filed Jun. 2, 2009), U.S. Publication Number 2003/0139312A1 (filed May 11, 2000) and U.S. Patent Application No. 61/229,981 (filed Jul. 30, 2009), each of which are assigned to the Procter & Gamble Company. Additionally or alternatively, the compositions may comprise surfactants and/or solvent systems, each of which is described below.

Surfactants

The detergent compositions can comprise from about 1% to 80% by weight of a surfactant. Surfactant is particularly preferred as a component of the first composition. Preferably, the first composition comprises from about 5% to 50% by weight of surfactant. The second and third compositions may comprise surfactant at levels of from 0.1 to 99.9%.

Detersive surfactants utilized can be of the anionic, nonionic, zwitterionic, ampholytic or cationic type or can comprise compatible mixtures of these types. More preferably surfactants are selected from the group consisting of anionic, nonionic, cationic surfactants and mixtures thereof. Preferably the compositions are substantially free of betaine surfactants. Detergent surfactants useful herein are described in U.S. Pat. Nos. 3,664,961; 3,919,678; 4,222,905; and 4,239,659. Anionic and nonionic surfactants are preferred.

Useful anionic surfactants can themselves be of several different types. For example, water-soluble salts of the higher fatty acids, i.e., "soaps", are useful anionic surfactants in the compositions herein. This includes alkali metal soaps such as the sodium, potassium, ammonium, and alkyl ammonium salts of higher fatty acids containing from about 8 to about 24 carbon atoms, and preferably from about 12 to about 18 carbon atoms. Soaps can be made by direct saponification of fats and oils or by the neutralization of free fatty acids. Particularly useful are the sodium and potassium salts of the mixtures of fatty acids derived from coconut oil and tallow, i.e., sodium or potassium tallow and coconut soap.

Additional non-soap anionic surfactants which are suitable for use herein include the water-soluble salts, preferably the alkali metal, and ammonium salts, of organic sulfuric reaction products having in their molecular structure an alkyl group containing from about 10 to about 20 carbon atoms and a sulfonic acid or sulfuric acid ester group. (Included in the term "alkyl" is the alkyl portion of acyl groups.) Examples of this group of synthetic surfactants include: a) the sodium, potassium and ammonium alkyl sulfates, especially those obtained by sulfating the higher alcohols ($C_8$-$C_{18}$) such as those produced by reducing the glycerides of tallow or coconut oil; b) the sodium, potassium and ammonium alkyl polyethoxylate sulfates, particularly those in which the alkyl group contains from 10 to 22, preferably from 12 to 18 carbon atoms, and wherein the polyethoxylate chain contains from 1 to 15, preferably 1 to 6 ethoxylate moieties; and c) the sodium and potassium alkylbenzene sulfonates in which the alkyl group contains from about 9 to about 15 carbon atoms, in straight chain or branched chain configuration, e.g., those of the type described in U.S. Pat. Nos. 2,220,099 and 2,477,383. Especially valuable are linear straight chain alkylbenzene sulfonates in which the average number of carbon atoms in the alkyl group is from about 11 to 13, abbreviated as $C_{11}$-$C_{13}$ LAS.

Preferred nonionic surfactants are those of the formula $R_1(OC_2H_4)_nOH$, wherein $R_1$ is a $C_{10}$-$C_{16}$ alkyl group or a $C_8$-$C_{12}$ alkyl phenyl group, and n is from 3 to about 80. Particularly preferred are condensation products of $C_{12}$-$C_{15}$ alcohols with from about 5 to about 20 moles of ethylene oxide per mole of alcohol, e.g., $C_{12}$-$C_{13}$ alcohol condensed with about 6.5 moles of ethylene oxide per mole of alcohol.

Solvent System

The solvent system in the present compositions can be a solvent system containing water alone or mixtures of organic solvents with water. Preferred organic solvents include 1,2-propanediol, ethanol, glycerol, dipropylene glycol, methyl propane diol and mixtures thereof. Other lower alcohols, $C_1$-$C_4$ alkanolamines such as monoethanolamine and triethanolamine, can also be used. Solvent systems can be absent, for example from anhydrous solid embodiments of the disclosure, but more typically are present at levels in the range of from about 0.1% to about 98%, preferably at least about 1% to about 50%, more usually from about 5% to about 25%.

The compositions herein can generally be prepared by mixing the ingredients together. If a pearlescent material is used it should be added in the late stages of mixing. If a rheology modifier is used, it is preferred to first form a pre-mix within which the rheology modifier is dispersed in a portion of the water and optionally other ingredients eventually used to comprise the compositions. This pre-mix is formed in such a way that it forms a structured liquid. To this structured pre-mix can then be added, while the pre-mix is under agitation, the surfactant(s) and essential laundry adjunct materials, along with water and whatever optional detergent composition adjuncts are to be used.

The pH of the useful compositions may be about 4 to about 12, about 5.5 to about 9.5, about 6 to about 8.5, or about 6.5 to about 8.2. Laundry detergent compositions may have a pH of about 6 to about 10, about 6.5 to about 8.5, about 7 to about 7.5, or about 8 to about 10. Auto-dishwashing compositions may have a pH of about 8 to about 12. Laundry detergent additive compositions may have a pH of about 4 to about 8. Fabric enhancers may have a pH of about 4 to about 8.

The pH of the detergent is defined as the pH of an aqueous 10% (weight/volume) solution of the detergent at 20±2° C.; for solids and powdered detergent this is defined as the pH of an aqueous 1% (weight/volume) solution of the detergent at 20±2° C. Any meter capable of measuring pH to ±0.01 pH units is suitable. Orion meters (Thermo Scientific, Clintinpark—Keppekouter, Ninovesteenweg 198, 9320 Erembodegem—Aalst, Belgium) or equivalent are acceptable instruments. The pH meter should be equipped with a suitable glass electrode with calomel or silver/silver chloride reference. An example includes Mettler DB 115. The electrode shall be stored in the manufacturer's recommended electrolyte solution.

The 10% aqueous solution of the detergent is prepared according to the following procedure. A sample of 10±0.05 grams is weighted with a balance capable of accurately measuring to ±0.02 grams. The sample is transferred to the a 100 mL volumetric flask, diluted to volume with purified water (deionised and/or distilled water are suitable as long as the conductivity of the water is <5 μS/cm), and thoroughly mixed. About 50 mL of the resulting solution is poured into a beaker, the temperature is adjusted to 20±2° C. and the pH is measured according to the standard procedure of the pH meter manufacturer (it is critical to follow the manufacturer's instructions to also set up and calibrate the pH assembly).

For solid and powdered detergents, the 1% aqueous solution of the detergent is prepared according to the following procedure. A sample of 10±0.05 grams is weighted with a balance capable of accurately measuring to ±0.02 grams. The sample is transferred to a volumetric flask of 1000 mL, diluted to volume with purified water (deionized and/or distilled water are suitable as long as the conductivity of the water is <50 μS/cm), and thoroughly mixed. About 50 mL of the resulting solution is poured into a beaker, the temperature is adjusted to 20±2° C. and the pH is measured according to the standard procedure of the pH meter manufacturer (it is critical to follow the manufacturer's instructions to also set up and calibrate the pH assembly).

Bleaches

Inorganic and organic bleaches are suitable cleaning actives for use herein. Inorganic bleaches include perhydrate salts such as perborate, percarbonate, perphosphate, persulfate and persilicate salts. The inorganic perhydrate salts are normally the alkali metal salts. The inorganic perhydrate salt may be included as the crystalline solid without additional protection. Alternatively, the salt can be coated as is known in the art.

Alkali metal percarbonates, particularly sodium percarbonate are preferred perhydrates for use in the detergent composition described herein. The percarbonate is most preferably incorporated into the products in a coated form which provides in-product stability. A suitable coating material providing in product stability comprises mixed salt of a water-soluble alkali metal sulphate and carbonate. Such coatings together with coating processes have previously been described in GB1,466,799, and U.S. Pat. Nos. 3,975,280; 4,075,116; and 5,340,496, each incorporated herein by reference. The weight ratio of the mixed salt coating material to percarbonate lies in the range from 1:99 to 1:9, and preferably from 1:49 to 1:19. Preferably, the mixed salt is of sodium sulphate and sodium carbonate which has the general formula $Na_2SO_4 + n \cdot Na_2CO_3$ wherein n is from 0.1 to 3, preferably from 0.3 to 1.0, and more preferably from 0.2 to 0.5. Another suitable coating material providing in product stability comprises sodium silicate of $SiO_2:Na_2O$ ratio from 1.8:1 to 3.0:1, preferably 1.8:1 to 2.4:1, and/or sodium metasilicate, preferably applied at a level of from 2% to 10%, (normally from 3% to 5%) of $SiO_2$ by weight of the inorganic perhydrate salt, such as potassium peroxymonopersulfate. Other coatings which contain magnesium silicate, silicate and borate salts, silicate and boric acids, waxes, oils, and fatty soaps can also be used advantageously.

Organic bleaches can include organic peroxyacids including diacyl and tetraacylperoxides, especially diperoxydodecanedioc acid, diperoxytetradecanedioc acid, and diperoxyhexadecanedioc acid. Dibenzoyl peroxide is a preferred organic peroxyacid herein. The diacyl peroxide, especially dibenzoyl peroxide, preferably can be present in the form of particles having a weight average diameter of from about 0.1 to about 100 microns, preferably from about 0.5 to about 30 microns, more preferably from about 1 to about 10 microns. Preferably, at least about 25% to 100%, more preferably at least about 50%, even more preferably at least about 75%, most preferably at least about 90%, of the particles are smaller than 10 microns, preferably smaller than 6 microns.

Other organic bleaches include the peroxy acids, particular examples being the alkylperoxy acids and the arylperoxy acids. Preferred representatives are: (a) peroxybenzoic acid and its ring-substituted derivatives, such as alkylperoxybenzoic acids, but also peroxy-α-naphthoic acid and magnesium monoperphthalate; (b) the aliphatic or substituted aliphatic peroxy acids, such as peroxylauric acid, peroxystearic acid, ε-phthalimidoperoxycaproic acid[phthaloiminoperoxyhexanoic acid (PAP)], o-carboxybenzamidoperoxycaproic acid, N-nonenylamidoperadipic acid and N-nonenylamidopersuccinates; and (c) aliphatic and araliphatic peroxydicarboxylic acids, such as 1,12-diperoxycarboxylic acid, 1,9-diperoxyazelaic acid, diperoxysebacic acid, diperoxybrassylic acid, the diperoxyphthalic acids, 2-decyldiperoxybutane-1,4-dioic acid, N,N-terephthaloyldi(6-aminopercaproic acid)

Bleach activators can include organic peracid precursors that enhance the bleaching action in the course of cleaning at temperatures of 60° C. and below. Bleach activators suitable for use herein include compounds which, under perhydrolysis conditions, give aliphatic peroxoycarboxylic acids having preferably from 1 to 10 carbon atoms, in particular from 2 to 4 carbon atoms, and/or optionally substituted perbenzoic acid. Suitable substances bear O-acyl and/or N-acyl groups of the number of carbon atoms specified and/or optionally substituted benzoyl groups. Preference is given to polyacylated alkylenediamines, in particular tetraacetylethylenediamine (TAED), acylated triazine derivatives, in particular 1,5-diacetyl-2,4-dioxohexahydro-1,3,5-triazine (DADHT), acylated glycolurils, in particular tetraacetylglycoluril (TAGU), N-acylimides, in particular N-nonanoylsuccinimide (NOSI), acylated phenolsulfonates, in particular n-nonanoyl- or isononanoyloxybenzenesulfonate (n- or iso-NOBS), carboxylic anhydrides, in particular phthalic anhydride, acylated polyhydric alcohols, in particular triacetin, ethylene glycol diacetate and 2,5-diacetoxy-2,5-dihydrofuran and also triethylacetyl citrate (TEAC).

Bleach catalysts preferred for use in the detergent composition herein include the manganese triazacyclononane and related complexes (U.S. Pat. No. 4,246,612, U.S. Pat. No. 5,227,084); Co, Cu, Mn and Fe bispyridylamine and related complexes (U.S. Pat. No. 5,114,611); and pentamine acetate cobalt(III) and related complexes (U.S. Pat. No. 4,810,410). A complete description of bleach catalysts suitable for use herein can be found in U.S. Pat. No. 6,599,871, incorporated herein by reference.

Dishwashing Agents

A preferred surfactant for use in automatic dishwashing detergents is low foaming by itself or in combination with other components (e.g. suds suppressers). Preferred for use herein are low and high cloud point nonionic surfactants and mixtures thereof including nonionic alkoxylated surfactants (especially ethoxylates derived from $C_6$-$C_{18}$ primary alcohols), ethoxylated-propoxylated alcohols (e.g., Olin Corporation's POLY-TERGENT® SLF18), epoxy-capped poly (oxyalkylated) alcohols (e.g., Olin Corporation's POLY-TERGENT® SLF18B—see WO-A-94/22800), ether-capped poly(oxyalkylated) alcohol surfactants, and block polyoxyethylene-polyoxypropylene polymeric compounds such as PLURONIC®, REVERSED PLURONIC®, and TETRONIC® by the BASF-Wyandotte Corp., Wyandotte, Mich.; amphoteric surfactants such as the $C_{12}$-$C_{20}$ alkyl amine oxides (preferred amine oxides for use herein include lauryldimethyl amine oxide and hexadecyl dimethyl amine oxide), and alkyl amphocarboxylic surfactants such as MIRANOL™ C2M; and zwitterionic surfactants such as the betaines and sultaines; and mixtures thereof. Surfactants suitable for use herein are disclosed, for example, in U.S. Pat. No. 3,929,678, U.S. Pat. No. 4,259,217, EP-A-0414 549, WO-A-93/08876 and WO-A-93/08874. Surfactants can be present at a level of from about 0.2% to about 30% by weight, more preferably from about 0.5% to about 10% by weight, most preferably from about 1% to about 5% by weight of a detergent composition.

Other Additives

Builders suitable for use herein include water-soluble builders, including citrates, carbonates, silicate and polyphosphates, e.g. sodium tripolyphosphate and sodium tripolyphosphate hexahydrate, potassium tripolyphosphate and mixed sodium and potassium tripolyphosphate salts.

Enzymes suitable for use in the detergent composition described herein include bacterial and fungal cellulases such as CAREZYME and CELLUZYME (Novo Nordisk A/S); peroxidases; lipases such as AMANO-P (Amano Pharmaceutical Co.), M1 LIPASE and LIPOMAX (Gist-Brocades) and LIPOLASE and LIPOLASE ULTRA (Novo); cutinases; proteases such as ESPERASE, ALCALASE, DURAZYM and SAVINASE (Novo) and MAXATASE, MAXACAL, PROPERASE and MAXAPEM (Gist-Brocades); α and β amylases such as PURAFECT OX AM (Genencor) and TERMAMYL, BAN, FUNGAMYL, DURAMYL, and NATALASE (Novo); pectinases; and mixtures thereof. Enzymes are preferably added herein as prills, granulates, or cogranulates at levels typically in the range from about 0.0001% to about 2% pure enzyme by weight of the cleaning composition.

Suds suppressers suitable for use herein include nonionic surfactants having a low cloud point. "Cloud point" as used herein, is a well known property of nonionic surfactants which is the result of the surfactant becoming less soluble with increasing temperature, the temperature at which the appearance of a second phase is observable is referred to as the "cloud point" (See Van Nostrand's Scientific Encyclopedia, 4$^{th}$ Ed., p. 366, (1968)). As used herein, a "low cloud point" nonionic surfactant is defined as a nonionic surfactant system ingredient having a cloud point of less than 30° C., preferably less than about 20° C., and even more preferably less than about 10° C., and most preferably less than about 7.5° C. Low cloud point nonionic surfactants can include nonionic alkoxylated surfactants, especially ethoxylates derived from primary alcohol, and polyoxypropylene/polyoxyethylene/polyoxypropylene (PO/EO/PO) reverse block polymers. Also, such low cloud point nonionic surfactants can include, for example, ethoxylated-propoxylated alcohol (e.g., BASF Poly-Tergent® SLF18) and epoxy-capped poly (oxyalkylated) alcohols (e.g., BASF Poly-Tergent® SLF18B series of nonionics, as described, for example, in U.S. Pat. No. 5,576,281).

Other suitable components for use in the detergent composition described herein include cleaning polymers having anti-redeposition, soil release or other detergency properties. Preferred anti-redeposition polymers herein include acrylic acid containing polymers such as SOKALAN PA30, PA20, PA15, PA10 and SOKALAN CP10 (BASF GmbH), ACUSOL 45N, 480N, 460N (Rohm and Haas), acrylic acid/maleic acid copolymers such as SOKALAN CP5 and acrylic/methacrylic copolymers. Preferred soil release polymers herein include alkyl and hydroxyalkyl celluloses (U.S. Pat. No. 4,000,093), polyoxyethylenes, polyoxypropylenes and copolymers thereof, and nonionic and anionic polymers based on terephthalate esters of ethylene glycol, propylene glycol and mixtures thereof.

Heavy metal sequestrants and crystal growth inhibitors are also suitable for use in the detergent, for example diethylenetriamine penta (methylene phosphonate), ethylenediamine tetra(methylene phosphonate) hexamethylenediamine tetra (methylene phosphonate), ethylene diphosphonate, hydroxyethylene-1,1-diphosphonate, nitrilotriacetate, ethylenediaminotetracetate, ethylenediamine-N,N'-disuccinate in their salt and free acid forms.

Suitable for use in the detergent composition described herein is also a corrosion inhibitor, for example organic silver coating agents (especially paraffins such as WINOG 70 sold by Wintershall, Salzbergen, Germany), nitrogen-containing corrosion inhibitor compounds (for example benzotriazole and benzimadazole—see GB-A-1137741) and Mn(II) compounds, particularly Mn(II) salts of organic ligands.

Other suitable components herein include enzyme stabilizers, for example calcium ion, boric acid and propylene glycol.

Suitable rinse additives are known in the art. Commercial rinse aids for dishwashing typically are mixtures of low-foaming fatty alcohol polyethylene/polypropylene glycol ethers, solubilizers (for example cumene sulfonate), organic acids (for example citric acid) and solvents (for example ethanol). The function of such rinse aids is to influence the interfacial tension of the water in such a way that it is able to drain from the rinsed surfaces in the form of a thin coherent film, so that no water droplets, streaks, or films are left after the subsequent drying process. A review of the composition of rinse aids and methods for testing their performance is presented by W. Schirmer et al. in Tens. Surf. Det. 28, 313 (1991). European Patent 0 197 434 to Henkel describes rinse aids which contain mixed ethers as surfactants. Rinse additives such as fabric softeners and the like are also contemplated and suitable for encapsulation in a film according to the disclosure herein.

EXAMPLES

The following samples were prepared by admixing the designated weight percentages of the designated polymers.

PVOH polymers, for example those from the MOWIOL product line available from KURARAY AMERICA, Inc., Houston Tex., USA, are typically designated by a polymer grade product number. For example, the PVOH polymer 13-88 is a partially hydrolyzed MOWIOL polyvinyl alcohol with a specified, nominal viscosity of about 13 cP and a nominal degree of hydrolysis, expressed as a percentage of vinyl acetate units converted to vinyl alcohol units, of about 88%. The PVOH polymers used to form the examples listed below are designated by their polymer grade product numbers.

For the examples presented herein in Tables 2-5 below, the films were prepared by admixing the designated polymers in water with plasticizers and other minor additives such as processing aids. The wt. % of PVOH polymers in the tables below are specified as parts by weight of the PVOH resin. The PVOH resin formed the major fraction of the film components by dry weight (about 67% to about 75% by total weight, average 69%), together with about 19 wt. % to 29 wt. % (average 24 wt. %) total plasticizers including glycerine, propylene glycol, and sorbitol; and minor amounts (about 3 wt. % to 8 wt. % total; average 6 wt. %) of stabilizers and processing aids including antiblocks, antifoams, bleaching agents, fillers, and surfactant wetting agents. The solution was maintained at a temperature in the range of about 71° C. to about 93° C. and cast by applying the hot solution to a smooth surface and drying off water to create a film having a thickness in the range of about 60 to 90 µm (typical 76 µm) and a residual moisture content of about 4 to about 10 wt. %, as measured by Karl Fischer titration.

During preparation of PVOH resin solutions a browning effect can occur. Whereas, in most applications, clear and colorless water-soluble films are desirable, a suitable bleaching agent can be added to the PVOH resin solution. The use of sodium metabisulfite has been found to substantially maintain the solution clarity and colorlessness during preparation when used in an amount in the range of about 0.05 wt. % to about 1.0 wt. %, or about 0.05 wt. % to about 0.7 wt. %, or about 0.1 wt. % to about 0.5 wt. %, or about 0.1 wt. % to about 0.2 wt. %.

TABLE 2

| Sample ID | Packet Type | Wt % 13-88 | Wt % 15-79 | Wt % 23-88 | $\overline{H}°$ | $\overline{\mu}$ | RSI |
|---|---|---|---|---|---|---|---|
| 1 | S | 65 | 10 | 25 | 87.7 | 15.0 | 0.274 |
| 2 | S | 50 | | 50 | 88.0 | 17.2 | 0.278 |
| 3 | S | 50 | | 50 | 87.9 | 16.9 | 0.278 |
| 4 | S | 60 | | 40 | 88.3 | 16.6 | 0.282 |
| 5 | S | 60 | | 40 | 87.7 | 15.8 | 0.282 |
| 6 | S | 60 | | 40 | 88.3 | 16.6 | 0.282 |
| 7 | S | 75 | | 25 | 88.0 | 15.0 | 0.290 |
| 8 | S | 75 | | 25 | 87.7 | 14.4 | 0.290 |
| 9 | S | 85 | | 15 | 88.3 | 13.9 | 0.297 |
| 10 | S | 65 | 10 | 25 | 87.7 | 15.0 | 0.274 |
| 11 | M | 50 | | 50 | 88.1 | 17.1 | 0.278 |
| 12 | M | 50 | | 50 | 88.4 | 17.6 | 0.278 |
| 13 | M | 50 | | 50 | 87.9 | 17.8 | 0.278 |
| 14 | M | 50 | | 50 | 87.4 | 18.4 | 0.278 |
| 15 | M | 50 | | 50 | 87.4 | 18.4 | 0.278 |
| 16 | M | 50 | | 50 | 87.4 | 18.4 | 0.278 |
| 17 | S | 50 | | 50 | 87.9 | 16.9 | 0.278 |
| 18 | M | 50 | | 50 | 87.3 | 16.4 | 0.278 |
| 19 | M | 50 | | 50 | 86.8 | 16.9 | 0.278 |
| 20 | M | 50 | | 50 | 86.9 | 18.9 | 0.278 |
| 21 | M | 60 | | 40 | 88.2 | 16.2 | 0.282 |
| 22 | S | 60 | | 40 | 88.3 | 16.6 | 0.282 |
| 23 | S | 60 | | 40 | 87.7 | 15.8 | 0.282 |
| 24 | S | 60 | | 40 | 88.3 | 16.6 | 0.282 |
| 25 | M | 60 | | 40 | 88.3 | 16.6 | 0.282 |
| 26 | M | 60 | | 40 | 88.3 | 16.6 | 0.282 |
| 27 | M | 60 | | 40 | 88.3 | 16.6 | 0.282 |
| 28 | M | 60 | | 40 | 88.4 | 16.1 | 0.282 |
| 29 | M | 60 | | 40 | 86.8 | 15.5 | 0.282 |
| 30 | S | 75 | | 25 | 87.7 | 14.4 | 0.290 |
| 31 | M | 75 | | 25 | 87.1 | 16.1 | 0.290 |
| 32 | S | 85 | | 15 | 88.4 | 13.9 | 0.297 |
| 33 | M | 85 | | 15 | 88.3 | 13.9 | 0.297 |
| 34 | M | 85 | | 15 | 88.3 | 13.9 | 0.297 |
| 35 | M | | 41 | 59 | 85.8 | 19.7 | 0.221 |

Packet Type-S = Single Compartment-
M = Multiple Compartment

TABLE 3

| Sample ID | Packet Type | Wt % 8-88 | Wt % 13-88 | Wt % 15-79 | Wt % 23-88 | Wt % 30-88 | Wt % 40-88 | $\overline{H}°$ | $\overline{\mu}$ | RSI |
|---|---|---|---|---|---|---|---|---|---|---|
| C1 | S | | | 100 | | | | 81.6 | 15.3 | 0.133 |
| C2 | S | | 50 | 50 | | | | 84.3 | 13.7 | 0.211 |
| C3 | S | | | | 100 | | | 88 | 23 | 0.261 |
| C4 | S | | | | 100 | | | 88 | 23 | 0.261 |
| C5 | S | | | | 100 | | | 88 | 23 | 0.261 |
| C6 | S | | 100 | | | | | 88 | 13 | 0.308 |
| C7 | S | | 100 | | | | | 88 | 13 | 0.308 |
| C8 | S | | 100 | | | | | 88 | 13 | 0.308 |
| C9 | S | | 100 | | | | | 88.2 | 12.7 | 0.308 |
| C10 | S | | | | | 100 | | 88 | 30 | 0.433 |
| C11 | S | 34 | 33 | | 33 | | | 88 | 13.30 | 0.436 |
| C12 | S | 50 | | | 50 | | | 88 | 13.60 | 0.484 |
| C13 | S | | | | | | 100 | 88 | 40 | 0.575 |
| C14 | S | 50 | | | | 50 | | 88 | 15.5 | 0.579 |
| C15 | S | 75 | | | 25 | | | 88 | 10.4 | 0.702 |
| C16 | S | 75 | | | 25 | | | 88 | 11.1 | 0.741 |
| C17 | M | | | 50 | 50 | | | 84.7 | 19.12 | 0.211 |
| C18 | M | | 49 | 25 | 26 | | | 85.5 | 15.01 | 0.250 |
| C19 | M | | 50 | | 50 | | | 87.4 | 18.36 | 0.278 |
| C20 | M | | 100 | | | | | 87.9 | 13.30 | 0.308 |

TABLE 3-continued

| Sample ID | Packet Type | Wt % 8-88 | Wt % 13-88 | Wt % 15-79 | Wt % 23-88 | Wt % 30-88 | Wt % 40-88 | $\overline{H°}$ | $\overline{\mu}$ | RSI |
|---|---|---|---|---|---|---|---|---|---|---|
| C21 | M | | 100 | | | | | 86.9 | 12.30 | 0.308 |
| C22 | S | | 100 | | | | | 88.2 | 12.7 | 0.308 |

Packet Type-S = Single Compartment-
M = Multiple Compartment

TABLE 4

| Sample ID | Packet Type | Wt % 13-88 | Wt % 15-79 | Wt % 23-88 | Wash-Residue Value | Water-drop resistance value | Thermo-forming Converting Test |
|---|---|---|---|---|---|---|---|
| 1 | S | 65 | 10 | 25 | 0.8* | 17 | P |
| 2 | S | 50 | | 50 | 1.4* | 10 | P |
| 3 | S | 50 | | 50 | 2.2* | 32 | P |
| 4 | S | 60 | | 40 | 2.1* | 20 | P |
| 5 | S | 60 | | 40 | 0.8* | 15 | P |
| 6 | S | 60 | | 40 | 1.2* | 32 | P |
| 7 | S | 75 | | 25 | 1.2* | 43 | P |
| 8 | S | 75 | | 25 | 0.8* | 43 | P |
| 9 | S | 85 | | 15 | 2.4* | 43 | P |
| 10 | M | 65 | 10 | 25 | 1.6** | 17 | P |
| 11 | M | 50 | | 50 | 6.7** | 2 | P |
| 12 | M | 50 | | 50 | 5.3** | 28 | P |
| 13 | M | 50 | | 50 | 5.6** | 39 | P |
| 14 | M | 50 | | 50 | 3.9** | 32 | P |
| 15 | M | 50 | | 50 | 4.1** | 41 | P |
| 16 | M | 50 | | 50 | 5.1** | 46 | P |
| 17 | M | 50 | | 50 | 1.8** | 32 | P |
| 18 | M | 50 | | 50 | 5.2** | 35 | P |
| 19 | M | 50 | | 50 | 4.1** | 48 | P |
| 20 | M | 50 | | 50 | 4.1** | 25 | P |
| 21 | M | 60 | | 40 | 6.4** | 57 | P |
| 22 | M | 60 | | 40 | 2.3** | 20 | P |
| 23 | M | 60 | | 40 | 2.9** | 15 | P |
| 24 | M | 60 | | 40 | 2.8** | 32 | P |
| 25 | M | 60 | | 40 | 5.0** | 18 | P |
| 26 | M | 60 | | 40 | 5.4** | 50 | P |
| 27 | M | 60 | | 40 | 4.6** | 57 | P |
| 28 | M | 60 | | 40 | 6.1** | 59 | P |
| 29 | M | 60 | | 40 | 4.5** | 43 | P |
| 30 | M | 75 | | 25 | 0.6** | 43 | P |
| 31 | M | 75 | | 25 | 3.9** | 52 | P |
| 32 | M | 85 | | 15 | 2.6** | 43 | P |
| 33 | M | 85 | | 15 | 6.9** | 21 | P |
| 34 | M | 85 | | 15 | 5.7** | 29 | P |
| 35 | M | | 41 | 59 | 6.2** | 48 | P |

Packet Type-S = Single Compartment-
M = Multiple Compartment
*-3 week aged pouches
**-2 week aged pouches

TABLE 5

| Sample ID | Packet Type | Wt % 8-88 | Wt % 13-88 | Wt % 15-79 | Wt % 23-88 | Wt % 30-88 | Wt % 40-88 | Wash-Residue Value | Water-drop resistance value | Thermo-forming Converting Test |
|---|---|---|---|---|---|---|---|---|---|---|
| C1 | S | | | | 100 | | | 1.0* | 94 | F |
| C2 | S | | 50 | 50 | | | | 0.9* | 94 | F |
| C3 | S | | | | 100 | | | 4.1* | 72 | F |
| C4 | S | | | | 100 | | | 1.4* | 10 | F |
| C5 | S | | | | 100 | | | 0.7* | 14 | F |
| C6 | S | | 100 | | | | | 0.1* | 52 | F |
| C7 | S | | 100 | | | | | 0.6* | 50 | F |
| C8 | S | | 100 | | | | | 0.8* | 48 | F |
| C9 | S | | 100 | | | | | 1.5* | 38 | F |
| C10 | S | | | | | 100 | | 2.7* | 6 | P |
| C11 | S | 34 | 33 | | 33 | | | 0.4* | 42 | F |
| C12 | S | 50 | | | 50 | | | 1.4* | 23 | F |
| C13 | S | | | | | | 100 | 2.5* | 4 | F |
| C14 | S | 50 | | | | 50 | | 0.7* | 6 | F |
| C15 | S | 75 | | | 25 | | | 1.1* | 25 | F |
| C16 | S | 75 | | | | 25 | | 1.3* | 25 | F |
| C17 | M | | | 50 | 50 | | | 3.9** | 70 | F |
| C18 | M | | 49 | 25 | 26 | | | 3.8** | 80 | P |
| C19 | M | | 50 | | 50 | | | 4.4** | 88 | P |
| C20 | M | | | 100 | | | | 4.0** | 51 | F |
| C21 | M | | 100 | | | | | 2.6** | 78 | F |
| C22 | M | | 100 | | | | | 0.7** | 38 | F |

Packet Type-S = Single Compartment-
M = Multiple Compartment
*-3 week aged pouches
**-2 week aged pouches Additional specific embodiments include films that have the combined average degree of hydrolysis, weighted log average viscosity, and Resin Selection Index, as presented in the individual cells in Table 6.

TABLE 6

|  | $\bar{\mu}$ 13.5-20 | $\bar{\mu}$ 14-19 | $\bar{\mu}$ 15-18 | $\bar{\mu}$ 16-18 | $\bar{\mu}$ 17-18 | $\bar{\mu}$ 17.5 ± 0.5 |
|---|---|---|---|---|---|---|
| $\bar{H}°$ 84-90 | $\bar{H}°$ 84-90 | $\bar{H}°$ 84-90 | $\bar{H}°$ 84-90 | $\bar{H}°$ 84-90 | $\bar{H}°$ 84-90 | $\bar{H}°$ 84-90 |
|  | $\bar{\mu}$ 13.5-20 | $\bar{\mu}$ 14-19 | $\bar{\mu}$ 15-18 | $\bar{\mu}$ 16-18 | $\bar{\mu}$ 17-18 | $\bar{\mu}$ 17.5 ± 0.5 |
|  | RSI 0.285 ± 0.15 | RSI 0.285 ± 0.15 | RSI 0.285 ± 0.15 | RSI 0.285 ± 0.15 | RSI 0.285 ± 0.15 | RSI 0.285 ± 0.15 |
| $\bar{H}°$ 85-89 | $\bar{H}°$ 85-89 | $\bar{H}°$ 85-89 | $\bar{H}°$ 85-89 | $\bar{H}°$ 85-89 | $\bar{H}°$ 85-89 | $\bar{H}°$ 85-89 |
|  | $\bar{\mu}$ 13.5-20 | $\bar{\mu}$ 14-19 | $\bar{\mu}$ 15-18 | $\bar{\mu}$ 16-18 | $\bar{\mu}$ 17-18 | $\bar{\mu}$ 17.5 ± 0.5 |
|  | RSI 0.285 ± 0.15 | RSI 0.285 ± 0.15 | RSI 0.285 ± 0.15 | RSI 0.285 ± 0.15 | RSI 0.285 ± 0.15 | RSI 0.285 ± 0.15 |
| $\bar{H}°$ 86-88 | $\bar{H}°$ 86-88 | $\bar{H}°$ 86-88 | $\bar{H}°$ 86-88 | $\bar{H}°$ 86-88 | $\bar{H}°$ 86-88 | $\bar{H}°$ 86-88 |
|  | $\bar{\mu}$ 13.5-20 | $\bar{\mu}$ 14-19 | $\bar{\mu}$ 15-18 | $\bar{\mu}$ 16-18 | $\bar{\mu}$ 17-18 | $\bar{\mu}$ 17.5 ± 0.5 |
|  | RSI 0.285 ± 0.15 | RSI 0.285 ± 0.15 | RSI 0.285 ± 0.15 | RSI 0.285 ± 0.15 | RSI 0.285 ± 0.15 | RSI 0.285 ± 0.15 |
| $\bar{H}°$ 86.5 ± 0.5 | $\bar{H}°$ 86.5 ± 0.5 | $\bar{H}°$ 86.5 ± 0.5 | $\bar{H}°$ 86.5 ± 0.5 | $\bar{H}°$ 86.5 ± 0.5 | $\bar{H}°$ 86.5 ± 0.5 | $\bar{H}°$ 86.5 ± 0.5 |
|  | $\bar{\mu}$ 13.5-20 | $\bar{\mu}$ 14-19 | $\bar{\mu}$ 15-18 | $\bar{\mu}$ 16-18 | $\bar{\mu}$ 17-18 | $\bar{\mu}$ 17.5 ± 0.5 |
|  | RSI 0.285 ± 0.15 | RSI 0.285 ± 0.15 | RSI 0.285 ± 0.15 | RSI 0.285 ± 0.15 | RSI 0.285 ± 0.15 | RSI 0.285 ± 0.15 |

In one embodiment, a bleach additive can include the ingredients presented in Table 7.

TABLE 7

|  | A Wt. % |
|---|---|
| Sodium Percarbonate | 25 |
| Bleach activator[1] | 7 |
| Sodium Carbonate | 15 |
| Sodium Citrate | 10 |
| Zeolite | 10 |
| Sodium Sulfate | 15 |
| Enzymes | 2 |
| Optical brighteners | 2 |
| Miscellaneous | To 100 |

[1]Tetraacetyl ethylene diamine

In another embodiment, granular laundry detergents can include the ingredients presented in Table 8.

TABLE 8

|  | B Wt. % | C Wt. % | D Wt. % | E Wt. % | F Wt. % | G Wt. % |
|---|---|---|---|---|---|---|
| Linear alkylbenzene sulfonate with aliphatic carbon chain $C_{11-12}$ | 15 | 12 | 20 | 10 | 12 | 13 |
| Other surfactant | 1.6 | 1.2 | 1.9 | 3.2 | 0.5 | 1.2 |
| Phosphate builder(s) | 2 | 25 | 4 | 3 | 2 |  |
| Zeolite |  | 1 |  | 1 | 4 | 1 |
| Sodium carbonate | 9 | 20 | 10 | 17 | 5 | 23 |
| Polyacrylate (MW 4500) | 1 | 0.6 | 1 | 1 | 1.5 | 1 |
| Amphiphilic alkoxylated grease cleaning polymer[1] | 0.2 |  | 0.2 | 0.4 | 0.4 | 1.0 |
| Carboxymethyl cellulose (FinnFix BDA ex CPKelco) | 1 | — | 0.3 |  | 1.1 |  |
| Enzymes powders | 0.5 | 0.4 | 1.0 | 2.0 | 0.6 | 0.9 |
| Fluorescent Brightener(s) | 0.16 | 0.06 | 0.16 | 0.18 | 0.16 | 0.16 |
| Diethylene triamine pentaacetic acid or Ethylene diamine tetraacetic acid | 0.6 |  | 0.6 | 0.25 | 0.6 | 0.6 |

TABLE 8-continued

|  | B Wt. % | C Wt. % | D Wt. % | E Wt. % | F Wt. % | G Wt. % |
|---|---|---|---|---|---|---|
| $MgSO_4$ | 1 | 1 | 1 | 0.5 | 1 | 1 |
| Bleach(es) and Bleach activators | 6.9 |  | 6.1 | 2.1 | 1.2 | 4.7 |
| Sulfate/Moisture/Perfume | Balance to 100% | | | | | |

[1]Random graft copolymer is a polyvinyl acetate grafted polyethylene oxide copolymer having a polyethylene oxide backbone and multiple polyvinyl acetate side chains. The molecular weight of the polyethylene oxide backbone is about 6000 and the weight ratio of the polyethylene oxide to polyvinyl acetate is about 40 to 60 and no more than 1 grafting point per 50 ethylene oxide units.

In another embodiment, liquid laundry detergents can include the ingredients presented in Table 9.

TABLE 9

|  | H Wt. % | I Wt. % | J Wt. % | K Wt. % | L Wt. % | M Wt. % |
|---|---|---|---|---|---|---|
| Glycerol | 3 | 5 | 3 | 0.6 | 5 | 5.3 |
| 1,2 Propanediol | 16 | 14 | 16 |  | 12 | 10 |
| Citric acid | 1 |  | 1 |  | 0.5 | 0.5 |
| Isopropanol |  |  |  | 7.7 |  |  |
| NaOH | 0.5 |  | 3.5 |  | 1 |  |
| Marlipal | 22 |  | 22 |  | 14 | 20.1 |
| $C_{12-14}EO_7$ |  |  |  |  |  |  |
| $C_{13-15}EO_9$ | 1 | 15 | 1 |  |  |  |
| $C_{9-11}EO_9$ |  |  |  | 72 |  |  |
| Linear alkyl benzene sulfonic acid[1] | 16 | 25 | 16 |  | 23 | 24.6 |
| $C_{12-18}$ Fatty acid | 16 | 5 | 16 |  | 6 | 16.4 |
| $C_{12-14}$ alkyl ethoxy 3 sulfate |  |  |  |  | 9 |  |
| Enzymes | 2.5 | 1.5 | 2.5 | 2.0 | 1.5 | 2.0 |
| Polyethylene-imine ethoxylate PEI 600 E20 | 2 |  | 2 |  |  | 3.0 |
| Diethylene-triamine Pentaacetic Acid Dequest 2010 | 1.5 | 0.9 | 1.5 |  | 1 | 1.1 |
| Optical brightening agent | 1 | 1.2 | 1 | 0.5 |  | 0.2 |
| $MgCl_2$ |  |  |  |  |  | 0.2 |
| Potassium sulfite |  |  |  |  | 0.35 | 0.2 |

TABLE 9-continued

|  | H Wt. % | I Wt. % | J Wt. % | K Wt. % | L Wt. % | M Wt. % |
|---|---|---|---|---|---|---|
| Structurant |  | 0.21 |  |  | 0.15 |  |
| Silicone softening agent (PDMS) |  |  |  |  |  | 2.5 |
| Water | 8 | 10 | 8 | 6 | 9 |  |
| Miscellaneous (dyes, aesthetics, perfume etc) | To 100 | To 100 | To 100 | To 100 | To 100 |  |
| Monoethanol amine | To pH 7.6 | To pH 7.5 | To pH 7.4 | To pH 7.6 | To pH 7.6 | To pH 7.6 |

[1]Preferred LAS also comprise an alkyl group comprising from about 9 to about 15 carbon atoms, in straight chain configuration.

In another embodiment, the detergents can include the formulation presented in Table 10.

TABLE 10

|  | N Wt. % |
|---|---|
| Dimethyl monoethyl ether | 73.87 |
| Sodium lauryl sulfate | 6.00 |
| Dimethyl glyoxime | 1.00 |
| Isopropyl alcohol | 0.5 |
| Triazine stilbene (Tinopal UNPA-GX) | 0.4 |
| Monoethanol amine | 1.52 |
| Linear alcohol ethoxylate (Surfonic LF-17) | 13.61 |
| d-limonene | 3.00 |

In another embodiment, the benefit agent can include the formulation presented in Table 11.

TABLE 11

|  | O Wt. % | P Wt. % |
|---|---|---|
| Cationic Softener Active[1] | 65.0 | 65.0 |
| Fatty Acid[2] | 1.8 | 1.8 |
| TMPD[3] | 14.7 | 14.7 |
| Cocoamide 6EO[4] | 4.05 | 4.05 |
| Perfume | 5 | 2.5 |
| Perfume Microcapsules | — | 1.25 |
| Dye | 0.001 | 0.001 |
| Hexylene Glycol[6] | 5.63 | 5.6 |
| Ethanol[6] | 5.63 | 5.6 |

[1]Di(acyloxyethyl)(2-hydroxy ethyl) methyl ammonium methyl sulfate wherein the acyl group is derived from partially hydrogenated canola fatty acid.
[2]Partially hydrogenated canola fatty acid.
[3]2,2,4-trimethyl-1,3-pentanediol
[4]PEG 6 cocamide - polyethylene glycol amide of coconut fatty acid.
[5]Sodium salt of hydroxyethane diphosphonic acid
[6]Material included with softening active by supplier.

In another embodiment, multi compartment pouches can contain a plurality of benefit agents. By way of a non-limiting example, a three component pouch can contain the formulations presented in Table 12 in separate enclosures, where dosage is the amount of the formulation in the respective enclosure.

TABLE 12

|  | Q | R | S |
|---|---|---|---|
| Enclosure | 1 | 2 | 3 |
| Dosage | 32 g | 2.5 g | 2.5 g |
| Linear alkylbenzene sulfonic acid | 24.6 | 24.6 | 24.6 |
| C12-14 alkyl ethoxy 3 sulfate | 8.5 | 8.5 | 8.5 |
| C12-14 alkyl 7 ethoxylate | 20.1 | 20.1 | 20.1 |
| C12-18 Fatty acid |  |  |  |
| Citric acid | 0.5 | 0.5 | 0.5 |
| Protease enzyme | 1.5 | 1.5 | 1.5 |
| Amylase enzyme | 0.3 | 0.3 | 0.3 |
| Mannanase enzyme | 0.2 | 0.2 | 0.2 |
| Polyethyleneimine ethoxylate PEI600 E20 | 1.1 | 1.1 | 1.1 |
| Hydroxyethane diphosphonic acid (Dequest 2010) | 1.1 | 1.1 | 1.1 |
| Fluorescent brightening agents | 0.2 | 0.2 | 0.2 |
| 1,2 propane diol | 10.0 | 10.0 | 10.0 |
| Glycerol | 5.3 | 5.3 | 5.3 |
| Buffers (sodium hydroxide, monoethanolamine) | 10 | 10 | 10 |
| Sodium sulfite | 0.6 | 0.4 | 0.4 |
| Perfume | 1.7 | — | — |
| Dyes |  | 0.001 | 0.001 |
| Acusol 305, Rhom & Haas | 1.5 | — | — |
| Hydrogenated castor oil | 0.14 | 0.2 | 0.1 |
| Water |  | To 100% |  |

Examples of multicomponent pouches can include the formulations presented in Table 13.

TABLE 13

|  | T 3 compartments | | | U 2 compartments | | V 3 compartments | | |
|---|---|---|---|---|---|---|---|---|
| Compartment # | 1 | 2 | 3 | 1 | 2 | 1 | 2 | 3 |
| Dosage (g) | 34.0 | 3.5 | 3.5 | 30.0 | 5.0 | 25.0 | 1.5 | 4.0 |
| Ingredients |  |  |  | Weight % |  |  |  |  |
| Alkylbenzene sulfonic acid | 20.0 | 20.0 | 20.0 | 10.0 | 20.0 | 20.0 |  |  |
| Alkyl sulfate |  |  |  | 2.0 |  |  |  |  |
| C12-14 alkyl 7-ethoxylate | 17.0 | 17.0 | 17.0 |  | 17.0 | 17.0 |  |  |
| Cationic surfactant |  |  |  | 1.0 |  |  |  |  |
| Zeolite A |  |  |  | 10.0 |  |  |  |  |
| C12-18 Fatty acid | 13.0 | 13.0 | 13.0 |  | 18.0 | 18.0 |  |  |
| Sodium acetate |  |  |  | 4.0 |  |  |  |  |
| enzymes | 0-3 | 0-3 | 0-3 | 0-3 |  | 0-3 |  |  |
| Sodium Percarbonate |  |  |  | 11.0 |  |  |  |  |
| TAED |  |  |  | 4.0 |  |  |  |  |
| Organic catalyst [1] |  |  |  | 1.0 |  |  |  |  |
| PAP granule [2] |  |  |  |  |  |  |  | 50 |
| Polycarboxylate |  |  |  | 1.0 |  |  |  |  |
| Ethoxysulfated Hexamethylene Diamine Dimethyl Quat | 2.2 | 2.2 | 2.2 |  |  |  |  |  |

TABLE 13-continued

|  | T 3 compartments | | | U 2 compartments | | V 3 compartments | | |
|---|---|---|---|---|---|---|---|---|
| Compartment # | 1 | 2 | 3 | 1 | 2 | 1 | 2 | 3 |
| Dosage (g) | 34.0 | 3.5 | 3.5 | 30.0 | 5.0 | 25.0 | 1.5 | 4.0 |
| Ingredients | Weight % | | | | | | | |
| Hydroxyethane diphosphonic acid | 0.6 | 0.6 | 0.6 | 0.5 | | | | |
| Ethylene diamine tetra (methylene phosphonic) acid | | | | | | 0.4 | | |
| Brightener | 0.2 | 0.2 | 0.2 | 0.3 | | 0.3 | | |
| Mineral oil | | | | | | | | |
| Hueing dye [4] | | | 0.05 | | 0.035 | | 0.12 | |
| Perfume | 1.7 | 1.7 | | 0.6 | | 1.5 | | |
| Water and minors (antioxidant, aesthetics, . . .) | 10.0 | 10.0 | 10.0 | 4.0 | | | | |
| Buffers (sodium carbonate, monoethanolamine) [5] | To pH 8.0 for liquids To RA > 5.0 for powders | | | | | | | |
| Solvents (1,2 propanediol, ethanol) for liquids, sodium sulfate for powders | To 100% | | | | | | | |

[1] Sulfuric acid mono-[2-(3,4-dihydro-isoquinolin-2-yl)-1-(2-ethyl-hexyloxymethyl)-ethyl]ester as described in U.S. Pat. No. 7,169,744
[2] PAP = Phtaloyl-Amino-Peroxycaproic acid, as a 70% active wet cake
[3] Polyethylenimine (MW = 600) with 20 ethoxylate groups per -NH.
[4] Ethoxylated thiophene, EO ($R_1 + R_2$) = 5
[5] RA = Reserve Alkalinity (g NaOH/dose)

In another embodiment of multicomponent pouches, the respective enclosures can be filled with liquid and solid benefit agents. Non-limiting examples of two compartment pouches, W-Z, where one enclosure is filled with a liquid and one is filled with a solid include the formulations presented in Table 14 and Table 15.

TABLE 14

|  | W | X | Y | Z |
|---|---|---|---|---|
| Liquid formulation | XL1 | XL2 | XL3 | XL4 |
| dosage | 10 g | 5 g | 15 g | 7 |
|  | Wt % | Wt % | Wt % | Wt % |
| Marlipal C24-7 | 74 | | 20 | 14 |
| Non ionic surfactant Neodol 23-5 | | 55 | | |
| Anionic surfactant[1] | | 20 | 20 | 25 |
| Propane diol | 10 | 4 | 22 | 10 |
| Glycerol | 2 | 5 | 5 | |
| Soil dispersant[2] | | 2 | | |
| Amphiphilic alkoxylated grease cleaning polymer[3] | | | 5 | |
| Fatty acid | | | 10 | 20 |
| Enzymes | | | | 3 |
| Structurant | | | 3 | |
| Perfume | 7 | 10 | | |
| Water | 2 | 3 | 5 | |
| Monoethanol amine | To pH 7.5 | | | |
| Minors | To 100% | | | |

[1] Linear C11-13 alkyl benzene sulfonic acid
[2] (bis($C_2H_5O$)($C_2H_4O$)$_n$)($CH_3$)—$N^+$—$CxH2x$—$N^+$—($CH_3$)-bis(($C_2H_5O$)($C_2H_4O$)$_n$), wherein n = from 15 to 30, and x = from 3 to 8.
[3] Random graft copolymer is a polyvinyl acetate grafted polyethylene oxide copolymer having a polyethylene oxide backbone and multiple polyvinyl acetate side chains. The molecular weight of the polyethylene oxide backbone is about 6000 and the weight ratio of the polyethylene oxide to polyvinyl acetate is about 40 to 60 and no more than 1 grafting point per 50 ethylene oxide units.

TABLE 15

|  | W | X | Y | Z |
|---|---|---|---|---|
| Powder formulation | XP1 | XP2 | XP3 | XP4 |
| Dosage | 35 g | 25 g | 40 g | 30 g |
|  | Wt % | Wt % | Wt % | Wt % |
| Anionic surfactant | | 20 | 20 | 20 |
| Cationic surfactant | | | 1.5 | 1.5 |

TABLE 15-continued

|  | W | X | Y | Z |
|---|---|---|---|---|
| Bleach agent | 20 | 36 | 36 | 36 |
| Chelating agent | 0.8 | 2 | 2 | 2 |
| Enzyme | | 10 | 10 | 10 |
| Sodium carbonate | | 6 | 4 | 4 |
| Sodium bicarbonate | | | 4 | 4 |
| Zeolite | 40 | 20 | 15 | 15 |
| Fluorescent whitening agent | 0.5 | 3 | | 1 |
| Polymers | 2 | | 5 | 5 |
| Sodium sulfate | 15 | | | |
| Minors | To 100% | | | |

The foregoing description is given for clearness of understanding only, and no unnecessary limitations should be understood therefrom, as modifications within the scope of the disclosure may be apparent to those having ordinary skill in the art.

Throughout the specification, where compositions are described as including components or materials, it is contemplated that the compositions can also consist essentially of, or consist of, any combination of the recited components or materials, unless described otherwise. The invention illustratively disclosed herein suitably may be practiced in the absence of any element or step which is not specifically disclosed herein.

The practice of a method disclosed herein, and individual steps thereof, can be performed manually and/or with the aid of or automation provided by electronic equipment. Although processes have been described with reference to particular embodiments, a person of ordinary skill in the art will readily appreciate that other ways of performing the acts associated with the methods may be used. For example, the order of various of the steps may be changed without departing from the scope or spirit of the method, unless described otherwise. In addition, some of the individual steps can be combined, omitted, or further subdivided into additional steps.

Aspects of the Disclosure

A first aspect of the present disclosure is a water-soluble film that comprises at least 50 wt. % of a water-soluble polyvinyl alcohol (PVOH) resin, the resin having a viscosity average of at least about 13.5 cP, 14 cP, 15 cP, 16 cP, or 17 cP and at most about 20 cP, 19 cP, 18 cP, 17.5 cP as a 4 wt. % aqueous solution at 20° C., for example in a range of about 13.5 cP to about 20 cP, or about 14 cP to about 19 cP, or about 16 cP to about 18 cP, or about 17 cP to about 17.5 cP;

and a degree of hydrolysis of at least 84% or 85% and at most about 92%, 90%, 89%, 88%, or 87%, for example in a range of about 84% to about 90%, or 85% to 88%, or 86.5%;

the resin further having no more than 30 wt. % of a PVOH polymer having an average viscosity less than about 11 cP and a polydispersity index in a range of about 1.8 to about 2.3.

In any one of the embodiments of the first aspect, the resin can comprise at least two PVOH polymers, the first PVOH polymer having a viscosity of at least about 8 cP, 10 cP, 12 cP, or 13 cP and at most about 40 cP, 20 cP, 15 cP, or 13 cP, for example in a range of about 8 cP to about 40 cP, or about 10 cP to about 20 cP, or about 10 cP to about 15 cP, or about 12 cP to about 14 cP, or 13 cP; and the second PVOH polymer having a viscosity of at least about 10 cP, 20 cP, or 22 cP and at most about 40 cP, 30 cP, 25 cP, or 24 cP, for example in a range of about 10 cP to about 40 cP, or 20 to about 30 cP, or about 20 to about 25 cP, or about 22 to about 24, or about 23 cP;

the viscosity of the first PVOH polymer being less than the viscosity of the second PVOH polymer.

In any one of the embodiments of the first aspect, the resin can comprise a first PVOH polymer that has a polydispersity index (PDI) value in a range of about 1 to about 5; and a second PVOH polymer that has a PDI value in a range of about 1 to about 5; and each PVOH polymer can have a PDI value in a range of about 1.5 to about 3; or about 1.7 to about 2.2.

In any one of the embodiments of the first aspect, the resin can comprise about 10, 15, 20, 25, 30, 35, 40, 45, 50, 55, 60, 65, 70, 75, 80, 85, 90 wt. % of the first PVOH polymer, and about 10, 15, 20, 25, 30, 35, 40, 45, 50, 55, 60, 65, 70, 75, 80, 85, 90 wt. % of the second PVOH polymer, for example about 30 to about 85 wt. % of the first PVOH polymer, or about 45 to about 55 wt. % of the first PVOH polymer.

In any one of the embodiments of the first aspect, the total PVOH resin can have a PDI value greater than about 2, 2.2, 2.4, 2.6, 2.8, 3.0, 3.2, 3.4, 3.6, 3.8, 4.0, 4.2, 4.4, 4.6, 4.8, or 5.0; for example, the PDI value of the total resin can be greater than the PDI value of any individual PVOH polymer included in the resin.

In any one of the embodiments of the first aspect, the first PVOH polymer can have a weight average molecular weight ($\overline{M}w$) in a range of about 50,000 to about 300,000 Daltons, or about 60,000 to about 150,000 Daltons; and the second PVOH polymer can have a $\overline{M}w$ in a range of about 60,000 to about 300,000 Daltons, or about 80,000 to about 250,000 Daltons; optionally the second PVOH polymer can have a $\overline{M}w$ greater than the first PVOH polymer; and further optionally the resin can have no more than about 30 wt. % of a PVOH polymer having a $\overline{M}w$ less than about 70,000 Daltons.

In any one of the embodiments of the first aspect, the film further can include a plasticizer.

In any one of the embodiments of the first aspect, the film can have a residual moisture content of at least 4 wt. %, for example in a range of about 4 to about 10 wt. %.

In any one of the embodiments of the first aspect, the film can be characterized by a water-drop resistance value of at most about 60%, 50%, 45%, 40%, or 35%.

In any one of the embodiments of the first aspect, the film can be characterized by a wash-residue value of at most about 4.5, 4.0, 3.5, 3.0, 2.9, or 2.8, preferably at most about 2.7, 2.6, 2.5, 2.4, 2.3, 2.2, 2.1, or 2.0.

In any one of the embodiments of the first aspect, the film can be thermoformable.

In any one of the embodiments of the first aspect, the Resin Selection Index value can be in a range of 0.255 to 0.315, or 0.260 to 0.310, or 0.265 to 0.305, or 0.270 to 0.300, or 0.275 to 0.295, preferably 0.270 to 0.300.

A second aspect of the present disclosure is a water-soluble film that comprises about 4 to about 10 wt. % water, at least 50 wt. % of a PVOH resin, the resin comprising a blend of a first and a second PVOH polymer, the first PVOH polymer having a viscosity of at least 8 cP or 10 cP and at most 40 cP, 20 cP, or 15 cP, for example in a range of about 8 cP to about 40 cP, or about 10 cP to about 20 cP, or about 10 cP to about 15 cP; and the second PVOH polymer having a viscosity of at least 10 cP or 20 cP and at most 40 cP, 30 cP, or 25 cP, for example in a range of about 10 cP to about 40 cP, or about 20 cP to about 30 cP, or about 20 cP to about 25 cP;

the viscosity of the first PVOH polymer being less than the viscosity of the second PVOH polymer, and the resin having no more than 30 wt. % of a PVOH polymer having an average viscosity less than about 11 cP and a polydispersity index in a range of about 1.8 to about 2.3.

In any one of the embodiments of the second aspect, the resin can optionally have a viscosity average in a range of about 13.5 cP to about 20 cP, and further optionally a degree of hydrolysis of at least 84% or 85% and at most about 92%, 90%, 89%, 88%, or 87%, for example in a range of about 84% to about 90%, or 85% to 88%, or 86.5%.

In any one of the embodiments of the second aspect, the resin can comprise a first PVOH polymer that has a polydispersity index (PDI) value in a range of about 1 to about 5; and a second PVOH polymer that has a PDI value in a range of about 1 to about 5; and each PVOH polymer can have a PDI value in a range of about 1.5 to about 3; or about 1.7 to about 2.2.

In any one of the embodiments of the second aspect, the resin can comprise about 10, 15, 20, 25, 30, 35, 40, 45, 50, 55, 60, 65, 70, 75, 80, 85, 90 wt. % of the first PVOH polymer, and about 10, 15, 20, 25, 30, 35, 40, 45, 50, 55, 60, 65, 70, 75, 80, 85, 90 wt. % of the second PVOH polymer, for example about 30 wt. % to about 85 wt. % or about 45 wt. % to about 55 wt. % of the first PVOH polymer.

In any one of the embodiments of the second aspect, the total PVOH resin can have a PDI value greater than about 2, 2.2, 2.4, 2.6, 2.8, 3.0, 3.2, 3.4, 3.6, 3.8, 4.0, 4.2, 4.4, 4.6, 4.8, or 5.0; for example, the PDI value of the total resin can be greater than the PDI value of any individual PVOH polymer included in the resin.

In any one of the embodiments of the second aspect, the first PVOH polymer can have a weight average molecular weight ($\overline{M}w$) in a range of about 50,000 to about 300,000 Daltons, or about 60,000 to about 150,000 Daltons; and the second PVOH polymer can have a $\overline{M}w$ in a range of about 60,000 to about 300,000 Daltons, or about 80,000 to about 250,000 Daltons; the second polyvinyl alcohol polymer having a $\overline{M}w$ greater than the first polyvinyl alcohol polymer;

and, optionally, the resin having no more than about 30 wt. % of a PVOH polymer having a $\overline{M}w$ less than about 70,000 Daltons.

In any one of the embodiments of the second aspect, the film can be characterized by a water-drop resistance value of at most about 60%, 50%, 45%, 40%, or 35%.

In any one of the embodiments of the second aspect, the film can be characterized by a wash-residue value of at most about 4.5, 4.0, 3.5, 3.0, 2.9, or 2.8, preferably at most about 2.7, 2.6, 2.5, 2.4, 2.3, 2.2, 2.1, or 2.0.

In any one of the embodiments of the second aspect, the film further can include a plasticizer.

In any one of the embodiments of the second aspect, the film can be thermoformable.

In any one of the embodiments of the second aspect, the Resin Selection Index value can be in a range of 0.255 to 0.315, or 0.260 to 0.310, or 0.265 to 0.305, or 0.270 to 0.300, or 0.275 to 0.295, preferably 0.270 to 0.300.

A third aspect of the present disclosure is a water-soluble film that comprises about 4 to about 10 wt. % water, at least 50 wt. % of a PVOH resin, and optionally a plasticizer;
the resin having a ($\overline{M}w$) in a range of about 50,000 to about 300,000 Daltons and
a degree of hydrolysis in a range of about 84% to about 92%, 90%, or about 85% to about 88%;
the resin further having no more than 30 wt. % of a PVOH polymer having a $\overline{M}w$ less than about 70,000 Daltons.

In any one of the embodiments of the third aspect, the resin can optionally have a viscosity average in a range of about 13.5 cP to about 20 cP; and further optionally the resin can have no more than 30 wt. % of a PVOH polymer having an average viscosity less than about 11 cP and a polydispersity index in a range of about 1.8 to about 2.3.

In any one of the embodiments of the third aspect, the resin can comprise at least two PVOH polymers,
the first PVOH polymer having a viscosity of at least about 8 cP, 10 cP, 12 cP, or 13 cP and at most about 40 cP, 20 cP, 15 cP, or 13 cP, for example in a range of about 8 cP to about 40 cP, or about 10 cP to about 20 cP, or about 10 cP to about 15 cP, or about 12 cP to about 14 cP, or 13 cP; and
the second PVOH polymer having a viscosity of at least about 10 cP, 20 cP, or 22 cP and at most about 40 cP, 30 cP, 25 cP, or 24 cP, for example in a range of about 10 cP to about 40 cP, or 20 to about 30 cP, or about 20 to about 25 cP, or about 22 to about 24, or about 23 cP;
the viscosity of the first PVOH polymer being less than the viscosity of the second PVOH polymer.

In any one of the embodiments of the third aspect, the resin can comprise a first PVOH polymer that has a polydispersity index (PDI) value in a range of about 1 to about 5; and a second PVOH polymer that has a PDI value in a range of about 1 to about 5; and each PVOH polymer can have a PDI value in a range of about 1.5 to about 3; or about 1.7 to about 2.2.

In any one of the embodiments of the third aspect, the resin can comprise about 10, 15, 20, 25, 30, 35, 40, 45, 50, 55, 60, 65, 70, 75, 80, 85, 90 wt. % of the first PVOH polymer, and about 10, 15, 20, 25, 30, 35, 40, 45, 50, 55, 60, 65, 70, 75, 80, 85, 90 wt. % of the second PVOH polymer, for example about 30 to about 85 wt. % of the first PVOH polymer, or about 45 to about 55 wt. % of the first PVOH polymer.

In any one of the embodiments of the third aspect, the total PVOH resin can have a PDI value greater than about 2, 2.2, 2.4, 2.6, 2.8, 3.0, 3.2, 3.4, 3.6, 3.8, 4.0, 4.2, 4.4, 4.6, 4.8, or 5.0; for example, the PDI value of the total resin can be greater than the PDI value of any individual PVOH polymer included in the resin.

In any one of the embodiments of the third aspect, the film can be characterized by a water-drop resistance value of at most about 60%, 50%, 45%, 40%, or 35%.

In any one of the embodiments of the third aspect, the film can be characterized by a wash-residue value of at most about 4.5, 4.0, 3.5, 3.0, 2.9, or 2.8, preferably at most about 2.7, 2.6, 2.5, 2.4, 2.3, 2.2, 2.1, or 2.0.

In any one of the embodiments of the third aspect, the film can be thermoformable.

In any one of the embodiments of the third aspect, the Resin Selection Index value can be in a range of 0.255 to 0.315, or 0.260 to 0.310, or 0.265 to 0.305, or 0.270 to 0.300, or 0.275 to 0.295, preferably 0.270 to 0.300.

A fourth aspect of the present disclosure is a water-soluble film that comprises at least 50 wt. % of a PVOH resin having a Resin Selection Index value in a range of 0.255 to 0.315, or 0.260 to 0.310, or 0.265 to 0.305, or 0.270 to 0.300, or 0.275 to 0.295, preferably 0.270 to 0.300.

In any one of the embodiments of the fourth aspect, the resin can optionally have a viscosity average in a range of about 13.5 cP to about 20 cP, and further optionally a degree of hydrolysis of at least 84% or 85% and at most about 92%, 90%, 89%, 88%, or 87%, for example in a range of about 84% to about 90%, or 85% to 88%, or 86.5%.

In any one of the embodiments of the fourth aspect, the resin can comprise at least two PVOH polymers,
the first PVOH polymer having a viscosity of at least about 8 cP, 10 cP, 12 cP, or 13 cP and at most about 40 cP, 20 cP, 15 cP, or 13 cP, for example in a range of about 8 cP to about 40 cP, or about 10 cP to about 20 cP, or about 10 cP to about 15 cP, or about 12 cP to about 14 cP, or 13 cP; and
the second PVOH polymer having a viscosity of at least about 10 cP, 20 cP, or 22 cP and at most about 40 cP, 30 cP, 25 cP, or 24 cP, for example in a range of about 10 cP to about 40 cP, or 20 to about 30 cP, or about 20 to about 25 cP, or about 22 to about 24, or about 23 cP;
the viscosity of the first PVOH polymer being less than the viscosity of the second PVOH polymer.

In any one of the embodiments of the fourth aspect, the resin can comprise a first PVOH polymer that has a polydispersity index (PDI) value in a range of about 1 to about 5; and a second PVOH polymer that has a PDI value in a range of about 1 to about 5; and each PVOH polymer can have a PDI value in a range of about 1.5 to about 3; or about 1.7 to about 2.2.

In any one of the embodiments of the fourth aspect, the resin can comprise about 10, 15, 20, 25, 30, 35, 40, 45, 50, 55, 60, 65, 70, 75, 80, 85, 90 wt. % of the first PVOH polymer, and about 10, 15, 20, 25, 30, 35, 40, 45, 50, 55, 60, 65, 70, 75, 80, 85, 90 wt. % of the second PVOH polymer, for example about 30 to about 85 wt. % of the first PVOH polymer, or about 45 to about 55 wt. % of the first PVOH polymer.

In any one of the embodiments of the fourth aspect, the total PVOH resin can have a PDI value greater than about 2, 2.2, 2.4, 2.6, 2.8, 3.0, 3.2, 3.4, 3.6, 3.8, 4.0, 4.2, 4.4, 4.6, 4.8, or 5.0; for example, the PDI value of the total resin can be greater than the PDI value of any individual PVOH polymer included in the resin.

In any one of the embodiments of the fourth aspect, the first PVOH polymer can have a weight average molecular weight ($\overline{M}w$) in a range of about 50,000 to about 300,000 Daltons, or about 60,000 to about 150,000 Daltons; and the second PVOH polymer can have a $\overline{M}w$ in a range of about 60,000 to about 300,000 Daltons, or about 80,000 to about 250,000 Daltons; the second polyvinyl alcohol polymer having a $\overline{M}w$ greater than the first polyvinyl alcohol polymer; and, optionally, the resin having no more than about 30 wt. % of a PVOH polymer having a $\overline{M}w$ less than about 70,000 Daltons.

In any one of the embodiments of the fourth aspect, the film further can include a plasticizer.

In any one of the embodiments of the fourth aspect, the film can have a residual moisture content of about 4 to about 10 wt. %.

In any one of the embodiments of the fourth aspect, the film can be characterized by a water-drop resistance value of at most about 60%, 50%, 45%, 40%, or 35%.

In any one of the embodiments of the fourth aspect, the film can be characterized by a wash-residue value of at most about 4.5, 4.0, 3.5, 3.0, 2.9, or 2.8, preferably at most about 2.7, 2.6, 2.5, 2.4, 2.3, 2.2, 2.1, or 2.0.

In any one of the embodiments of the fourth aspect, the film can be thermoformable.

A fifth aspect of the present disclosure is a method of making a water-soluble film that has about 4 to about 10 wt. % water, at least 50 wt. % of a PVOH resin, and optionally a plasticizer, the method including forming a film from a PVOH resin having a viscosity average in a range of about 13.5 cP to about 20 cP and a degree of hydrolysis of at least 84% or 85% and at most about 92%, 90%, 89%, 88%, or 87%, for example in a range of about 84% to about 90%, or 85% to 88%, or 86.5%; the resin further having no more than 30 wt. % of a PVOH polymer having an average viscosity less than about 11 cP and a polydispersity index in a range of about 1.8 to about 2.3.

In any one of the embodiments of the fifth aspect, the resin can comprise at least two PVOH polymers, the first PVOH polymer having a viscosity of at least about 8 cP, 10 cP, 12 cP, or 13 cP and at most about 40 cP, 20 cP, 15 cP, or 13 cP, for example in a range of about 8 cP to about 40 cP, or about 10 cP to about 20 cP, or about 10 cP to about 15 cP, or about 12 cP to about 14 cP, or 13 cP; and the second PVOH polymer having a viscosity of at least about 10 cP, 20 cP, or 22 cP and at most about 40 cP, 30 cP, 25 cP, or 24 cP, for example in a range of about 10 cP to about 40 cP, or 20 to about 30 cP, or about 20 to about 25 cP, or about 22 to about 24, or about 23 cP;

the viscosity of the first PVOH polymer being less than the viscosity of the second PVOH polymer.

In any one of the embodiments of the fifth aspect, the method can include admixing, cocasting, or welding a first PVOH polymer and a second PVOH polymer to form the PVOH resin.

In any one of the embodiments of the fifth aspect, the resin can comprise a first PVOH polymer that has a polydispersity index (PDI) value in a range of about 1 to about 5; and a second PVOH polymer that has a PDI value in a range of about 1 to about 5; and each PVOH polymer can have a PDI value in a range of about 1.5 to about 3; or about 1.7 to about 2.2.

In any one of the embodiments of the fifth aspect, the resin can comprise about 10, 15, 20, 25, 30, 35, 40, 45, 50, 55, 60, 65, 70, 75, 80, 85, 90 wt. % of the first PVOH polymer, and about 10, 15, 20, 25, 30, 35, 40, 45, 50, 55, 60, 65, 70, 75, 80, 85, 90 wt. % of the second PVOH polymer, for example about 30 to about 85 wt. % of the first PVOH polymer, or about 45 to about 55 wt. % of the first PVOH polymer.

In any one of the embodiments of the fifth aspect, the total PVOH resin can have a PDI value greater than about 2, 2.2, 2.4, 2.6, 2.8, 3.0, 3.2, 3.4, 3.6, 3.8, 4.0, 4.2, 4.4, 4.6, 4.8, or 5.0; for example, the PDI value of the total resin can be greater than the PDI value of any individual PVOH polymer included in the resin.

In any one of the embodiments of the fifth aspect, the first PVOH polymer can have a weight average molecular weight ($\overline{M}w$) in a range of about 50,000 to about 300,000 Daltons, or about 60,000 to about 150,000 Daltons; and the second PVOH polymer can have a $\overline{M}w$ in a range of about 60,000 to about 300,000 Daltons, or about 80,000 to about 250,000 Daltons; the second polyvinyl alcohol polymer having a $\overline{M}w$ greater than the first polyvinyl alcohol polymer; and, optionally, the resin having no more than about 30 wt. % of a PVOH polymer having a $\overline{M}w$ less than about 70,000 Daltons.

In any one of the embodiments of the fifth aspect, the film can be characterized by a water-drop resistance value of at most about 60%, 50%, 45%, 40%, or 35%.

In any one of the embodiments of the fifth aspect, the film can be characterized by a wash-residue value of at most about 4.5, 4.0, 3.5, 3.0, 2.9, or 2.8, preferably at most about 2.7, 2.6, 2.5, 2.4, 2.3, 2.2, 2.1, or 2.0.

In any one of the embodiments of the fifth aspect, the film can be thermoformable.

In any one of the embodiments of the fifth aspect, the Resin Selection Index value can be in a range of 0.255 to 0.315, or 0.260 to 0.310, or 0.265 to 0.305, or 0.270 to 0.300, or 0.275 to 0.295, preferably 0.270 to 0.300.

A sixth aspect of the present disclosure is a sealable packet or a pouch that comprises a PVOH film as described herein, for example in any one or more of the first through fifth aspects.

In any one of the embodiments of the sixth aspect, the PVOH film is disposed as an outer wall of the pouch or packet.

In any one of the embodiments of the sixth aspect, the pouch or packet can comprise a single sealed or sealable compartment or a plurality of sealed or sealable compartments, optionally with the outer walls of the entire pouch or packet comprising a PVOH film according to the disclosure, and further optionally with at least one inner wall also comprising a PVOH film according to the disclosure. The PVOH film or films forming the one or more outer walls of the pouch or packet can be the same as or different from the film or films forming one or more inner walls of a multicompartment pouch or packet, and optionally are the same.

In any one of the embodiments of the sixth aspect, the Resin Selection Index value of the PVOH resins in the PVOH film can be in a range of 0.255 to 0.315, or 0.260 to 0.310, or 0.265 to 0.305, or 0.270 to 0.300, or 0.275 to 0.295, preferably 0.270 to 0.300.

In one embodiment of the sixth aspect, the pouch comprises a first and a second sealed compartment. The second compartment is in a generally superposed relationship with the first sealed compartment such that the second sealed compartment and the first sealed compartment share a partitioning wall interior to the pouch.

In one embodiment of the sixth aspect, the pouch comprising a first and a second compartment further comprises a third sealed compartment. The third sealed compartment is in a generally superposed relationship with the first sealed compartment such that the third sealed compartment and the first sealed compartment share a partitioning wall interior to the pouch.

In some embodiments according to the sixth aspect, the first composition and the second composition are selected from one of the following combinations: liquid, liquid; liquid, powder; powder, powder; and powder, liquid.

In some embodiments according to the sixth aspect, the first, second and third compositions are selected from one of the following combinations: solid, liquid, liquid and liquid, liquid, liquid.

In any one of the embodiments of the sixth aspect, the single compartment or plurality of sealed compartments contains a composition. The plurality of compartments may each contain the same or a different composition. The composition is selected from a liquid, solid or combination thereof.

In any one of the embodiment of the sixth aspect, the composition may be selected from the group of liquid light duty and liquid heavy duty liquid detergent compositions, powdered detergent compositions, dish detergent for hand washing and/or machine washing; hard surface cleaning compositions, fabric enhancers, detergent gels commonly used for laundry, and bleach and laundry additives, shampoos, and body washes.

All patents, publications and references cited herein are hereby fully incorporated by reference. In case of conflict between the present disclosure and incorporated patents, publications and references, the present disclosure should control.

The invention claimed is:

1. A pouch comprising a first sealed compartment containing a first composition, said first sealed compartment comprising at least one wall that comprises a water-soluble film, said water-soluble film comprising:
at least 50 wt. % of a water-soluble polyvinyl alcohol (PVOH) resin, said PVOH resin having an average viscosity in a range of about 13.5 cP to about 20 cP, and a degree of hydrolysis in a range of about 84% to about 92%, said PVOH resin comprising a blend of first and second PVOH polymers, said first PVOH polymer having a viscosity in a range of 13 cP to about 40 cP, said second PVOH polymer having a viscosity in a range of 20 cP to about 40 cP, and said viscosity of said first PVOH polymer being less than said viscosity of said second PVOH polymer; and said film further having no more than 30 wt. % of a PVOH polymer having a viscosity less than about 11 cP.

2. The pouch of claim 1, wherein said film is characterized by a Resin Selection Index value in a range of about 0.255 to about 0.315.

3. The pouch of claim 1, said film further comprising a Water-Drop Resistance Test value of at most about 60%.

4. The pouch of claim 1, said film further comprising a Wash-Residue Test value of at most about 4.5.

5. The pouch of claim 1, said film further comprising a residual moisture content of at least about 4 wt %.

6. The pouch of claim 1, wherein said first composition has a pH from about 5.5 to about 9.5 when measured as 10% aqueous solution for liquid compositions, or as 1% aqueous solution for solid compositions at 20±2° C.

7. The pouch of claim 1, wherein said first sealed compartment further comprises a different film.

8. The pouch of claim 1, wherein said wall that comprises said water-soluble film is disposed as an outer wall of said pouch.

9. The pouch of claim 1, wherein said first composition is selected from: a liquid light duty detergent composition; a liquid heavy duty liquid detergent composition, a powdered detergent composition; a dish detergent composition for hand washing; a dish detergent composition for machine washing; a hard surface cleaning composition; a fabric enhancer; a laundry detergent gel; a bleach and laundry additive; a shampoo; a body wash; and a combination thereof.

10. The pouch of claim 1, further comprising a second sealed compartment attached to said first compartment, said second sealed compartment containing a second composition.

11. The pouch of claim 10, wherein said first sealed compartment and said second sealed compartment are conjoined about a partitioning wall.

12. The pouch of claim 10, further comprising a third sealed compartment attached to either the first sealed compartment or the second sealed compartment, said third sealed compartment containing a third composition.

13. A pouch comprising a first sealed compartment containing a first composition and, and a second sealed compartment containing a second composition, wherein:
said second compartment is attached to said first compartment in a generally superposed relationship such that said compartments share a partitioning wall interior to said pouch, said pouch comprising at least one wall of water-soluble film that is disposed as an outer wall of said pouch, said water-soluble film comprising:
at least 50 wt. % of a water-soluble polyvinyl alcohol (PVOH) resin, said PVOH resin having an average viscosity in a range of about 13.5 cP to about 20 cP, and a degree of hydrolysis in a range of about 84% to about 92%, said PVOH resin comprising a blend of first and second PVOH polymers, said first PVOH polymer having a viscosity in a range of 13 cP to about 40 cP, said second PVOH polymer having a viscosity in a range of 20 cP to about 40 cP, and said viscosity of said first PVOH polymer being less than said viscosity of said second PVOH polymer; and
said film: further comprising about 1 wt % to about 40 wt % of plasticizer; having no more than 30 wt. % of a PVOH polymer having a viscosity less than about 11 cP; and being characterized by a Resin Selection Index Value in a range of about 0.255 to about 0.315.

14. The pouch of claim 13, wherein said first and second compositions have a pH from about 5.5 to about 9.5 when measured as 10% aqueous solution for liquid compositions, or as 1% aqueous solution for solid compositions at 20±2° C.

15. The pouch of claim 13, wherein said first composition and said second composition are combinations of compositions selected from the group consisting of: liquid, liquid; liquid, powder; and powder, powder.

16. The pouch of claim 13, wherein each wall of said pouch comprises said water-soluble film.

17. The pouch of claim 13, further comprising a third sealed compartment containing a third composition.

18. The pouch of claim 17, wherein said first, second and third compositions are combinations of compositions selected from the group consisting of: solid, solid, solid; solid, solid, liquid; solid, liquid, liquid; and liquid, liquid, liquid.

19. The pouch of claim 18, wherein said first, second and third compositions are, individually, selected from the group consisting of: liquid light duty detergent compositions; liquid heavy duty liquid detergent compositions, powdered detergent compositions; dish detergent for hand washing; dish detergent for machine washing; hard surface cleaning compositions, fabric enhancers; laundry detergent gels; bleach and laundry additives; shampoos; body washes; and combinations thereof.

20. A pouch comprising:
a. a first sealed compartment containing a first composition;
b. a second sealed compartment containing a second composition;

c. a third sealed compartment containing a third composition;

wherein each of said first, second and third compositions are, individually, selected from the group consisting of: a liquid, a powder and a combination thereof; and said pouch comprises at least one outer wall of water-soluble film comprising:

at least 50 wt. % of a water-soluble polyvinyl alcohol (PVOH) resin, said PVOH resin having an average viscosity in a range of about 13.5 cP to about 20 cP, and a degree of hydrolysis in a range of about 84% to about 92%, said PVOH resin comprising a blend of first and second PVOH polymers, said first PVOH polymer having a viscosity in a range of 13 cP to about 40 cP, said second PVOH polymer having a viscosity in a range of 20 cP to about 40 cP, and said viscosity of said first PVOH polymer being less than said viscosity of said second PVOH polymer; and said film further having no more than 30 wt. % of a PVOH polymer having a viscosity less than about 11 cP, and being characterized by: a Resin Selection Index value in a range of about 0.255 to about 0.315; a residual moisture content of at least about 4 wt %; a Water-Drop Resistance Test value of at most about 60%; and a Wash-Residue Test value of at most about 4.5.

* * * * *